US011900052B2

(12) United States Patent
Li et al.

(10) Patent No.: US 11,900,052 B2
(45) Date of Patent: Feb. 13, 2024

(54) AUTOMATIC GENERATION OF TRANSFORMATIONS OF FORMATTED TEMPLATES USING DEEP LEARNING MODELING

(71) Applicant: Microsoft Technology Licensing, LLC, Redmond, WA (US)

(72) Inventors: Ji Li, San Jose, CA (US); Amit Srivastava, San Jose, CA (US); Mingxi Cheng, Los Angeles, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 578 days.

(21) Appl. No.: 17/095,603

(22) Filed: Nov. 11, 2020

(65) Prior Publication Data

US 2022/0147702 A1 May 12, 2022

(51) Int. Cl.
*G06N 3/02* (2006.01)
*G06N 3/088* (2023.01)
(Continued)

(52) U.S. Cl.
CPC .......... *G06F 40/186* (2020.01); *G06F 40/103* (2020.01); *G06N 3/02* (2013.01);
(Continued)

(58) Field of Classification Search
CPC ....... G06F 40/103; G06F 40/186; G06K 9/46; G06N 20/00; G06N 3/02; G06N 3/088; G06N 5/04; G06V 10/40
See application file for complete search history.

(56) References Cited

U.S. PATENT DOCUMENTS 10,657,676 B1 * 5/2020 Rehfeld ................. G06N 3/047
10,997,369 B1 * 5/2021 Frazier .................... H04L 51/42
(Continued)

FOREIGN PATENT DOCUMENTS

WO WO-2013009710 A1 * 1/2013 ............ G06F 16/116

OTHER PUBLICATIONS

Hascoët, Mountaz. "Visual color design." 2012 16th International Conference on Information Visualisation. IEEE, 2012. (Year: 2012).*
(Continued)

*Primary Examiner* — Kamran Afshar
*Assistant Examiner* — Randall K. Baldwin

(57) ABSTRACT

The present disclosure applies trained artificial intelligence (AI) processing adapted to automatically generating transformations of formatted templates. Pre-existing formatted templates (e.g., slide-based presentation templates) are leveraged by the trained AI processing to automatically generate a plurality of high-quality template transformations. In transforming a formatted template, the trained AI processing not only generates feature transformation of objects thereof but may also provide style transformations where attributes associated with a presentation theme may be modified for a formatted template or set of formatted templates. The trained AI processing is novel in that it is tailored for analysis of feature data of a specific type of formatted template. The trained AI processing converts a formatted template into a feature vector and utilizes conditioned generative modeling to generate one or more transformed templates using a representation of the feature data and feature data from one or more other formatted templates.

20 Claims, 8 Drawing Sheets

(51) Int. Cl.

| | |
|---|---|
| ***G06N 5/04*** | (2023.01) |
| ***G06F 40/186*** | (2020.01) |
| ***G06N 20/00*** | (2019.01) |
| ***G06F 40/103*** | (2020.01) |
| ***G06V 10/40*** | (2022.01) |

(52) U.S. Cl.

CPC ............... *G06N 3/088* (2013.01); *G06N 5/04* (2013.01); *G06N 20/00* (2019.01); *G06V 10/40* (2022.01)

(56) References Cited

U.S. PATENT DOCUMENTS

| | | | | |
|---|---|---|---|---|
| 2006/0066627 A1* | 3/2006 | Gerhard | G06T 11/60 | 345/593 |
| 2007/0079236 A1* | 4/2007 | Schrier | G06F 40/114 | 715/209 |
| 2009/0006459 A1* | 1/2009 | Parks | G06F 40/103 | 707/999.102 |
| 2013/0111324 A1* | 5/2013 | Kern | G06F 40/117 | 715/230 |
| 2013/0207988 A1* | 8/2013 | Artigue | G06F 9/451 | 345/589 |
| 2019/0147287 A1* | 5/2019 | Glover | G06V 10/803 | 382/209 |
| 2019/0197487 A1* | 6/2019 | Jersin | H04L 51/214 | |
| 2020/0134090 A1* | 4/2020 | Mankovskii | G06V 10/762 | |
| 2020/0372073 A1* | 11/2020 | Dahl | G06V 10/82 | |
| 2021/0287430 A1* | 9/2021 | Li | G06V 10/776 | |
| 2021/0326494 A1* | 10/2021 | White | G06N 3/045 | |
| 2022/0129758 A1* | 4/2022 | Sallee | G06F 18/23 | |
| 2022/0215606 A1* | 7/2022 | Radford | G06F 40/103 | |

OTHER PUBLICATIONS

Dibia, Victor, and çağatay Demiralp. "Data2vis: Automatic generation of data visualizations using sequence-to-sequence recurrent neural networks." IEEE computer graphics and applications 39.5 (2019): 33-46. (Year: 2019).*

Kovacs, Balazs, et al. "Context-aware asset search for graphic design." IEEE transactions on visualization and computer graphics 25.7 (2018): 2419-2429. (Year: 2019).*

Li, Manyi, et al. "Grains: Generative recursive autoencoders for indoor scenes." ACM Transactions on Graphics (TOG) 38.2 (2019): 1-16. (Year: 2019).*

Li, Jianan, et al. "Layoutgan: Generating graphic layouts with wireframe discriminators." arXiv preprint arXiv:1901.06767 (2019): 1-16 (Year: 2019).*

Cheng, Mingxi, Shahin Nazarian, and Paul Bogdan. "VRoC: Variational Autoencoder-aided Multi-task Rumor Classifier Based on Text." (Apr. 2020) (Year: 2020).*

Lee, Hsin-Ying, et al. "Neural Design Network: Graphic Layout Generation with Constraints." arXiv preprint arXiv:1912.09421v2 (Jul. 2020): 1-16 (Year: 2020).*

Tian, Zhiyong. "Dynamic visual communication image framing of graphic design in a virtual reality environment." IEEE Access 8 (Sep. 2020): 211091-211103. (Year: 2020).*

Patil, Akshay Gadi, et al. "Read: Recursive autoencoders for document layout generation." Proceedings of the IEEE/CVF Conference on Computer Vision and Pattern Recognition Workshops. Jun. 2020: 544-545 (Year: 2020).*

Chen, Zhutian, et al. "Towards automated infographic design: Deep learning-based auto-extraction of extensible timeline." IEEE transactions on visualization and computer graphics 26.1 (2019): 917-926. (Year: 2019).*

"International Search Report and Written Opinion Issued in PCT Application No. PCT/US2021/053446", dated Jan. 18, 2022, 12 Pages.

* cited by examiner

100

120

160

300

320

340

AUTOMATIC GENERATION OF TRANSFORMATIONS OF FORMATTED TEMPLATES USING DEEP LEARNING MODELING

BACKGROUND

Presentation templates typically have a lifecycle for usability as users continuously look for new content to enhance their presentations. In many cases, users may have preferences for specific styles and formats, but ultimately may seek some variation to help stand out and make their presentations unique. Traditionally, a limited number of pre-existing templates may be presented to a user to choose from. To create a modified template, a user is required to take manual action if they are seeking something different from those pre-existing templates. This can be tedious for the user as well as inefficient for execution of applications/services, where the applications/services are required to process a plurality of user actions (and associated data) to enable the user to create a customized presentation template.

As previously mentioned, a limited number of pre-existing slide-based templates may be pre-generated by developers and provided as a starting point for a user to create a presentation document. Traditionally, these pre-existing templates still require developers to manually create the slide-based templates by providing design input including stylistic and layout input for the templates to be generated. Even contemplating usage of modeling to help improve the generation processing presents technical challenges when working with formatted templates. This is because slide-based presentation templates have a lot of layers of complexity that need to be considered including varying content types, varying content positioning, layering considerations, and numerous formatting considerations (including headings, bullet points), etc. Such complexities make it extremely difficult for traditional trained modeling to generate transformations of slide-based presentation templates which are actually usable as consumable templates and further pass the eye test for users. For instance, traditional modeling may struggle with identification of shapes and shape positioning, where an attempted transformation of content portions typically results in a poorly generated layout that is not usable (e.g., incongruous shape merging, blurred and uneven lines, improper color scheme).

SUMMARY

For resolution of the above technical problems and other reasons, there is a technical need to provide solutions enabling automated generation of transformations of formatted templates that are high quality and usable to aid users with creation of presentation documents.

The present disclosure applies trained artificial intelligence (AI) processing adapted for the purpose of automatically generating transformations of formatted templates. Pre-existing formatted templates (e.g., slide-based presentation templates) are leveraged by the trained AI processing to automatically generate a plurality of high-quality template transformations that are desirable for users. In transforming a formatted template, the trained AI processing not only generates feature transformation of objects thereof but may also provide style transformations where attributes associated with a presentation theme may be modified for a formatted template or set of formatted templates. The trained AI processing is novel in that it is tailored for analysis of feature data of a specific type of formatted template. For instance, the trained AI processing converts a formatted template into a feature vector and utilizes conditioned generative modeling to generate one or more transformed templates using a representation of the feature data and feature data from one or more other formatted templates. Trained AI processing may further be tailored for working with formatted templates through the application of formatting rules specific to the type of formatted template that is being transformed. As such, the trained AI processing of the present disclosure can satisfy stringent template format requirements and further support problem simplification using a conditioned generation approach for those sensitive yet hard to learn features that are specific to types of formatted templates.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1A:
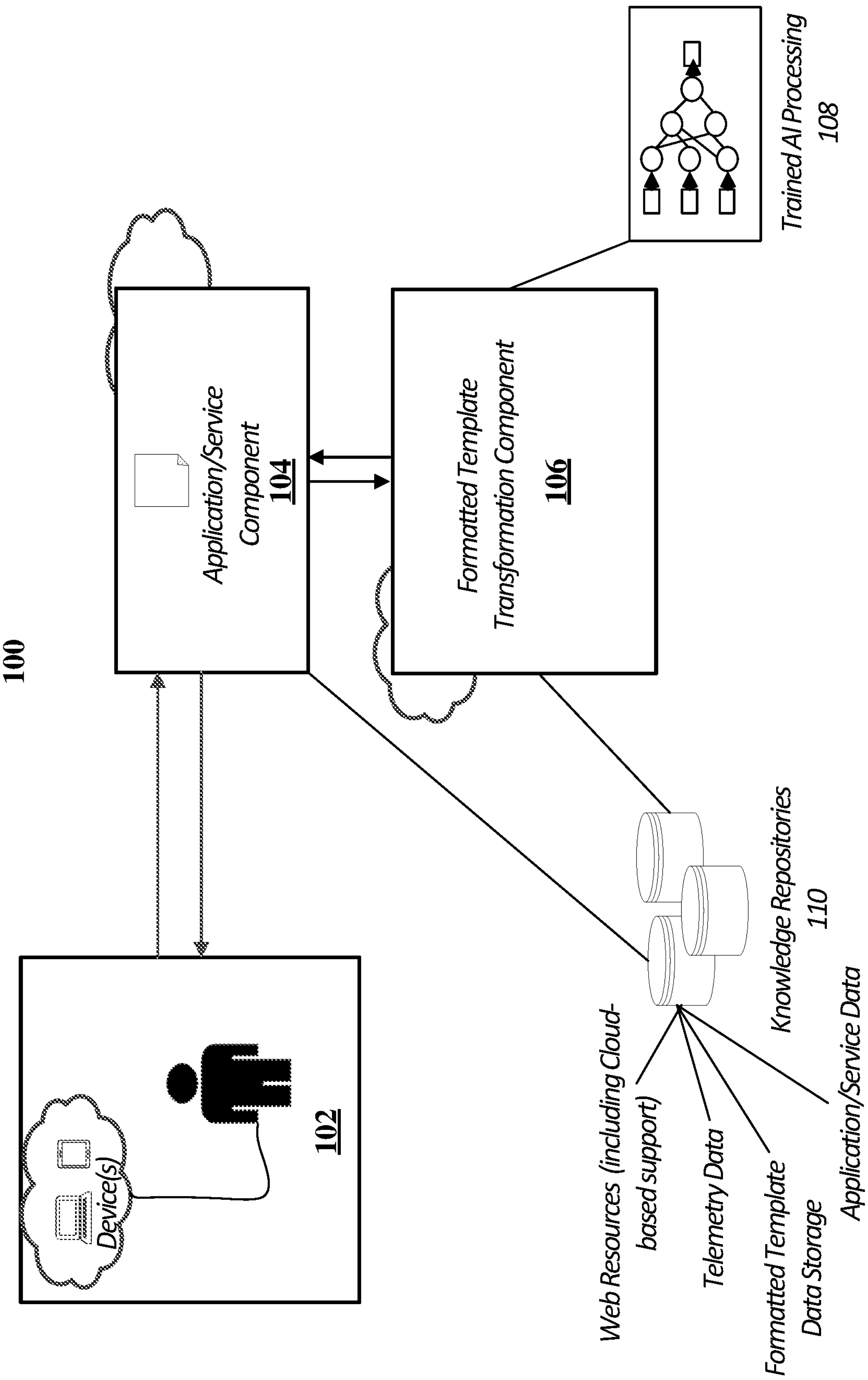
FIG. 1A illustrates an exemplary system diagram of components interfacing to enable automatic generation of transformations of formatted templates, with which aspects of the present disclosure may be practiced.

As identified above, the present disclosure applies trained artificial intelligence (AI) processing adapted for the purpose of automatically generating transformations of formatted templates. Pre-existing formatted templates (e.g., slide-based presentation templates) are leveraged by the trained AI processing to automatically generate a plurality of high-quality template transformations that are desirable for users.

In transforming a formatted template, the trained AI processing not only generates feature transformation of objects thereof but may also provide style transformations where attributes associated with a presentation theme may be modified for a formatted template or set of formatted templates. The trained AI processing is novel in that it is tailored for analysis of feature data of a specific type of formatted template. For instance, the trained AI processing converts a formatted template into a feature vector and utilizes conditioned generative modeling to generate one or more transformed templates using a representation of the feature data and feature data from one or more other formatted templates. Trained AI processing may further be tailored for working with formatted templates through the application of formatting rules specific to the type of formatted template that is being transformed. As such, the trained AI processing of the present disclosure can satisfy stringent template format requirements and further support problem simplification using a conditioned generation approach for those sensitive yet hard to learn features that are specific to types of formatted templates.

The present disclosure solves technical problems in the field of automated generation of formatted templates better than technical solutions that attempt to generate templates from processing of image-based results. In some cases, modeling may be applied to attempt to generate content transformations from image-based results. The present disclosure provides a technical advantage over image-based result modeling. Training of exemplary AI processing on the basis of feature data of formatted templates enables consumable template files to be accurately generated (e.g., through encoding and decoding) rather than relying on image-based results that need to be converted, analyzed and rendered to then become usable templates. With respect to image-based results, there is no current process available to convert an image file back to a consumable template file because the shape of objects (e.g., edges and boxes thereof) are not strictly straight. This poses a huge challenge for converting an image-based result back to a consumable template file as latent analysis of traditional generative modeling struggles attempting to confer a continuous space from sparsely distributed data often resulting in poorer quality results when attempting to render a modification of a formatted template. In the present disclosure, trained AI processing is conditioned based on feature data of consumable templates. For example, feature data, that is analyzed in formatted templates and further used to train deep learning modeling, is conditioned on shape information including shape position information of objects presented in formatted templates. Among other types of feature data analyzed, this helps deep learning modeling, of the trained AI processing, better understand content of formatted templates and produce the best results when attempting to transform formatted templates including those instances where shape position information is being merged between different formatted templates.

Moreover, in addition to generate transformations of objects of formatted templates, the trained AI processing is further configured to utilize feature data pertaining to style transformations of formatted templates to enhance transformation thereof. As an example, feature data pertaining to a presentation theme of a formatted template (or set of formatted templates) may be utilized to enhance transformation of a formatted template. An exemplary presentation theme is a collective set of visual style attributes that are applied to a formatted template (e.g., slide-based template). Non-limiting examples of visual style attributes of a theme that may be modifiable by the present disclosure to effect transformation of one or more formatted templates comprise but are not limited to: predefining layout attributes (e.g., grouping and/or layering of objects); colors scheme (including color scheme for a background of a slide); fonts (e.g., color, type, size); and visual effects, among other examples. A presentation theme thereby provides a presentation with a unified and harmonious appearance while minimizing the processing effort required to do so for formatted templates (e.g., a set of formatted templates). In some examples, encoder networks and decoder networks of trained AI processing may be trained based on presentation themes of formatted templates. This enables any respective visual style attributes of a theme to be utilized to modify another formatted template (e.g., color scheme, layering of objects, font, visual effects). In one example, a first encoder network and a first decoder network may be trained based on feature data of a first theme of formatted templates (e.g., visual style attributes thereof). Continuing that example, a second encoder network and a second decoder network may be trained based on feature data of a second theme of formatted templates (e.g., visual style attributes thereof). Prior to decoding processing, decoder networks applied to generate consumable templates for respective themes are swapped to create a style transformation of visual style attributes for formatted templates. It is noted that encoder and/or decoder networks may be trained based on any number of presentation themes. For instance, feature data from multiple different themes may be utilized to effect transformation of a formatted template including visual style attributes thereof.

One non-limiting example of transformation of a formatted template is now described. As a starting point, feature data for objects of a first slide-based template are extracted. The first slide-based template is associated with a first presentation theme providing a first set of visual style attributes for the first slide-based template. Trained AI processing, configured for generation of transformations of slide-templates, is applied to generate a transformation of the first slide-based template. Application of the trained AI processing is configured to execute a plurality of processing operations to generate a transformed template for the first slide-based template. As a non-limiting example, feature data comprises shape information. Non-limiting examples of shape information comprise but are not limited to: shape position information of objects presented in the first slide-based template; shape type; shape fill type; shape color; and shape layering/grouping, among other examples. Feature data may further comprise feature data pertaining to any visual style attributes for the first slide-based template, which may be analyzed in coordination with the feature data for objects of the first slide-based template.

Continuing the above example, the feature data of the first slide-based template may be encoded to generate a latent vector that provides a distributed representation of the feature data. The latent vector may then be propagated to a decoder network that is trained to analyze the latent vector and generate transformations of objects associated with a slide-based template. Object transformations may be modifications pertaining to objects themselves as well as the arrangement and layout of objects associated with the first slide-based template. Object transformation may occur based on analyze of the distributed representation of the feature data for the first slide-based template and in some cases correlation with a distributed representation of feature data for one or more other slide-based templates. Transformation may further comprise style transformations, which may occur based on a correlation with slide-based templates having a second presentation theme. The second presentation theme may be different from the first presentation theme and provides a second set of visual style attributes for objects thereof. The trained decoder network is further specialized in that it applies formatting rules specific to the type of formatted template (e.g., slide-based template) that is being generated. Decoding processing, using the trained decoder network, may then automatically generate a transformed template. The transformed template comprises: one or more transformations of the objects of the first slide-based template; and a style transformation modifying one or more visual style attributes of the first set of visual style attributes. For instance, a layout of objects of the first slide-based template may be modified such that location of the objects of the first slide-based template are rearranged in a new order. Furthermore, the transformed template modifies one or visual style attributes of the first set of visual style attributes associated with the first presentation theme. As an example, a color scheme of the first slide-based template may be modified based on a decoder network being trained based on the second presentation theme.

Processing in the above identified example can be extended to generate additional transformed templates such as transformed template for a second slide-based template that is associated with a second presentation theme. In further technical examples, processing may be applied to analyze a set of formatted templates (e.g., set of slide-based templates), where transformation thereof results in generation of a transformed set of formatted templates associated with a presentation theme.

The trained AI processing of the present disclosure is further unique in that comprehensive application of deep learning modeling occurs. Rather than simply relying one type of deep learning model which may have its strengths and weaknesses, multiple deep learning models can be applied to provide the most comprehensive and most accurate templatized transformations. For instance, trained AI processing may apply two or more different types of trained generative deep learning models to provide the best possible transformations of formatted templates. Modeling that relies on pure random generation may struggle due to the sparseness of datapoints in a latent space. As such, trained AI processing is conditioned for guided generation and style transfer of formatted templates. Non-limiting examples of the two or more types of trained generative deep learning models comprise but are not limited to: a variable auto encoder (VAE), a generative adversarial network (GAN), a generative pre-trained transformer (GPT) and a Deepfake learning model.

In one example, different deep learning models may be trained on different features/attributes of formatted templates (e.g., one model on shape position information and another model on visual style attributes). In other examples, multiple different types of deep learning models may be trained to focus on the same feature/attribute (e.g., shape position information) of a formatted template. Any arrangement of modeling described herein may be applied to effect the best possible transformations In some cases, a selection as to how many iterations of different modeling is to be applied may pertain to a determination as to a timing requirement for returning results. In one instance where processing is not time sensitive (e.g., occurring asynchronous to user access and request for content), transformed template candidates may be generated through application of each off: a conditioned VAE, a conditioned GAN and a conditioned GPT. Results may further be propagated to a Deepfake learning model to effect further transformed template candidates. In other technical instances where process is time sensitive (e.g., results need to be provided in real-time or near real-time), processing described herein may selectively determine a number (and order) of deep learning models to apply that fit within time constraints for working with specific applications/services (e.g., latency requirements of an application or service). In some technical examples, multiple sets of each type of generative deep learning model may be applied. For instance, a first VAE set (e.g., encoder/decoder) may be trained on formatted templates having a first presentation theme and a second VAE set (e.g., encoder/decoder) may be trained on formatted templates having a second presentation theme. In one non-limiting example, any of a VAE, GAN or GPT may be utilized to generate transformation of a layout position/arrangement of objects of a formatted template and a Deepfake learning model may be utilized to generate an exemplary style transformation. In any example, trained AI processing is improved by conditioning applied deep learning models based on feature data of formatted templates (e.g., shape position information of objects thereof).

Exemplary technical advantages provided by processing described in the present disclosure comprise but are not limited to: automated generation of transformation of formatted templates using state of the art deep generative learning modeling that generates consumable template files instead of image-based results; a comprehensive framework of trained AI processing that can be conditioned based on features of formatted templates and may comprise any type of deep generative modeling including: VAE; GAN; GPT; and Deepfake; supporting of training objective simplification (with conditioned generation) for those template features which are difficult to learn and generalize but also crucial to the generation quality; supporting of style transformation to generate more formatted templates with the style from one of the existing template families; supporting of utilization of feedback signals from postprocessing quality check and production experiments for model improvement that is targeted for template transformation; supporting of machine learning generated feedback that can be presented to users as creation guidance for creation of variations of formatted templates; new relevance ranking processing that can selectively curate results from formatted template transformation to determine the best possible output (and discard results that do not satisfy a threshold); improved quality and precision in generating exemplary transformed templates; an ability to leverage pre-existing families of formatted templates (e.g., slide-based templates) to efficiently generate transformed templates; improved processing efficiency (e.g., reduction in processing cycles, saving resources/bandwidth) for computing devices when generating transformations of formatted templates; adapting and improving a graphical user interface (GUI) of an application or service to integrate GUI elements for the provision of representations of transformed templates including GUI listing menus enabling users to select sets of transformed templates and provide feedback thereon; reduction in latency during formatted template generation through implementation of trained AI processing; reduction in the cost of template creation (e.g., the cost to hire vendors/well-trained designers to create new templates); generation of a novel contextual formatted template transformation component that is further configured to interface with a plurality of applications/services (e.g., applications/services of a distributed software platform) to extend functionality during processing; and improving usability of applications/services for users via integration of processing described herein, among other technical advantages.

FIG. 1A illustrates an exemplary system diagram 100 of components interfacing to enable automatic generation of transformations of formatted templates, with which aspects of the present disclosure may be practiced. As an example, components illustrated in system diagram 100 may be executed by an exemplary computing system 401 (or multiple computing systems) as described in the description of FIG. 4. System diagram 100 describes components that may be utilized to execute processing operations described in flow diagram 120 (FIG. 1B), flow diagram 160 (FIG. 1C), method 200 (FIG. 2) as well as processing described in and associated with visual diagrams of FIGS. 3A-3C and the accompanying description. Moreover, interactions between components of system diagram 100 may be altered without departing from the spirit of the present disclosure. Exemplary components, described in system diagram 100, may be hardware and/or software components, which are programmed to execute processing operations described herein. In some examples, components of system diagram 100 may each be one or more computing devices associated with execution of a specific service. Exemplary services may be managed by a software data platform (e.g., distributed software platform) that also provides, to a component, access to and knowledge of other components that are associated with applications/services. In one instance, processing operations described in system diagram 100 may be implemented by one or more components connected over a distributed network, where a user account may be working with a specific profile established through a distributed software platform. System diagram 100 comprises user computing devices 102; an application/service component 104; a formatted template transformation component 106; a component for implementation of trained AI processing 108; and knowledge repositories 110.

System diagram 100 comprises user computing device(s) 102. An example of a user computing device 102 is a computing system (or computing systems) as described in the description of FIG. 4. User computing device(s) 102 are intended to cover examples where a computing device is a client computing device that a user is utilizing to access an application or service such as presentation application/service. In alternative examples, the user computing device(s) 102 is also intended to cover examples of computing devices that developers (e.g., users) utilize to review processing for automated generation of formatted templates.

An exemplary application/service component 104 is configured to provide data for an exemplary application/service. The designation application/service is intended to cover any examples where an application or service is provided. Applications/services, provided through the application/service component 104, may be any type of programmed software. In one non-limiting example, a presentation application/service is a slide-based presentation application/service (e.g., POWERPOINT®). However, examples described herein are intended to work with any type of productivity application or service. A productivity application or service is configured for execution of tasks including the management of formatted templates including transformed templates automatically generated by the trained AI processing. Examples of productivity applications or services comprise but are not limited to: software development applications/services; word processing applications/services, spreadsheet applications/services, notes/notetaking applications/services, authoring applications/services, digital presentation applications/services, presentation broadcasting applications/services, search engine applications/services, email applications/services, messaging applications/services, web browsing applications/services, collaborative team applications/services, digital assistant applications/services, webpage building applications/service, directory applications/services, mapping services, calendaring services, electronic payment services, digital data storage or distributed data storage applications/services, web conferencing applications/services, call communication applications/services, language understanding applications/services, bot framework applications/services, networking applications/service, and social networking applications/services, among other examples. In some examples, an exemplary productivity application/service may be a component of a distributed software platform providing a suite of productivity applications/services. A distributed software platform is configured to providing access to a plurality of applications/services, thereby enabling cross-application/service usage to enhance functionality of a specific application/service at run-time. Distributed software platforms may further manage tenant configurations/user accounts to manage access to features, applications/services, etc. as well access to distributed data storage (including user-specific distributed data storage). Moreover, specific application/services (including those of a distributed software platform) may be configured to interface with other non-proprietary application/services (e.g., third-party applications/services) to extend functionality including data transformation and associated implementation.

Figure 3A:
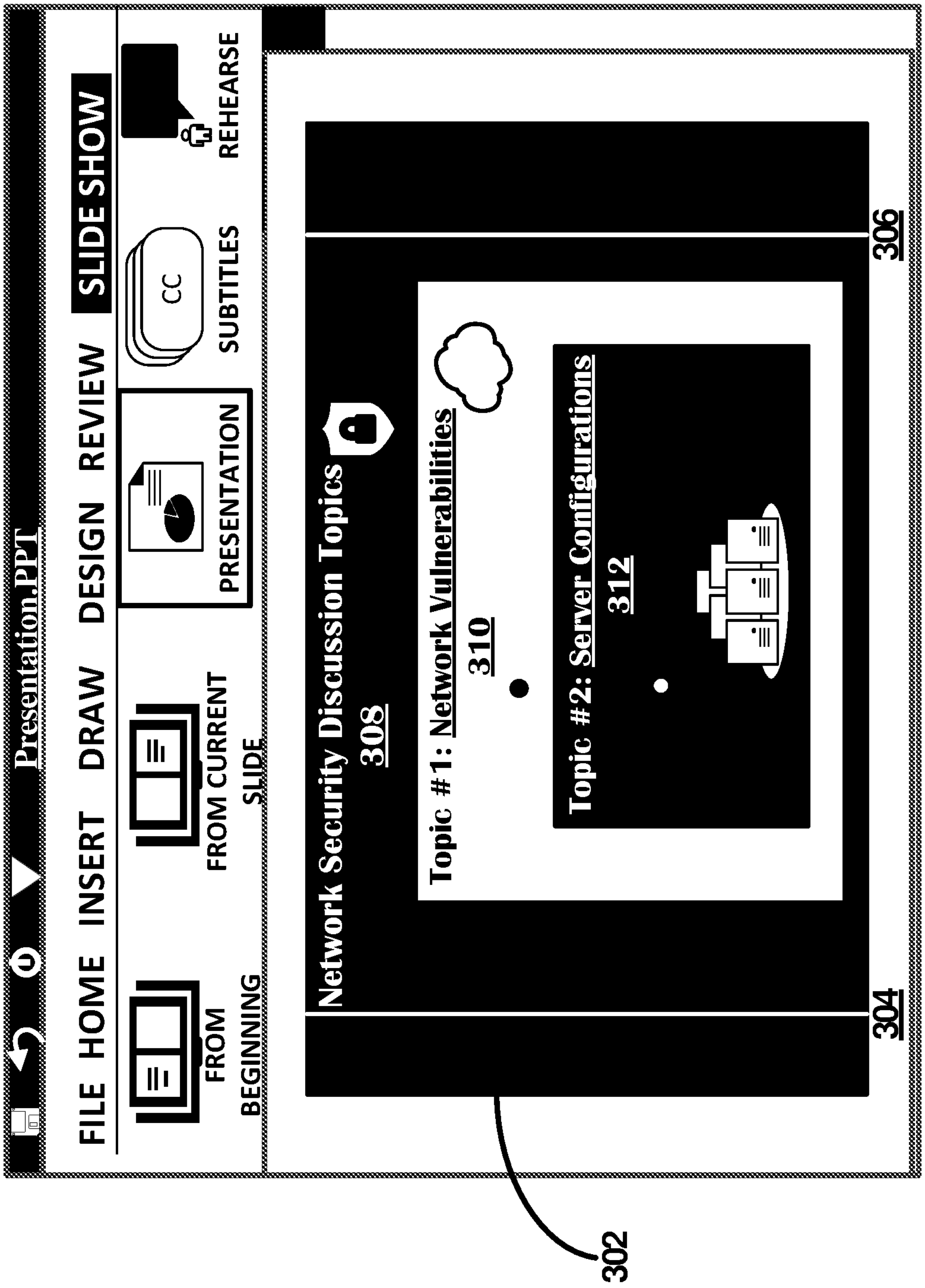
FIGS. 3A-3C illustrate exemplary processing device views associated with user interface examples for an improved user interface that is configured to enable provision of representations of transformations of slide-based formatted templates, with which aspects of the present disclosure may be practiced.
Figure 3B:
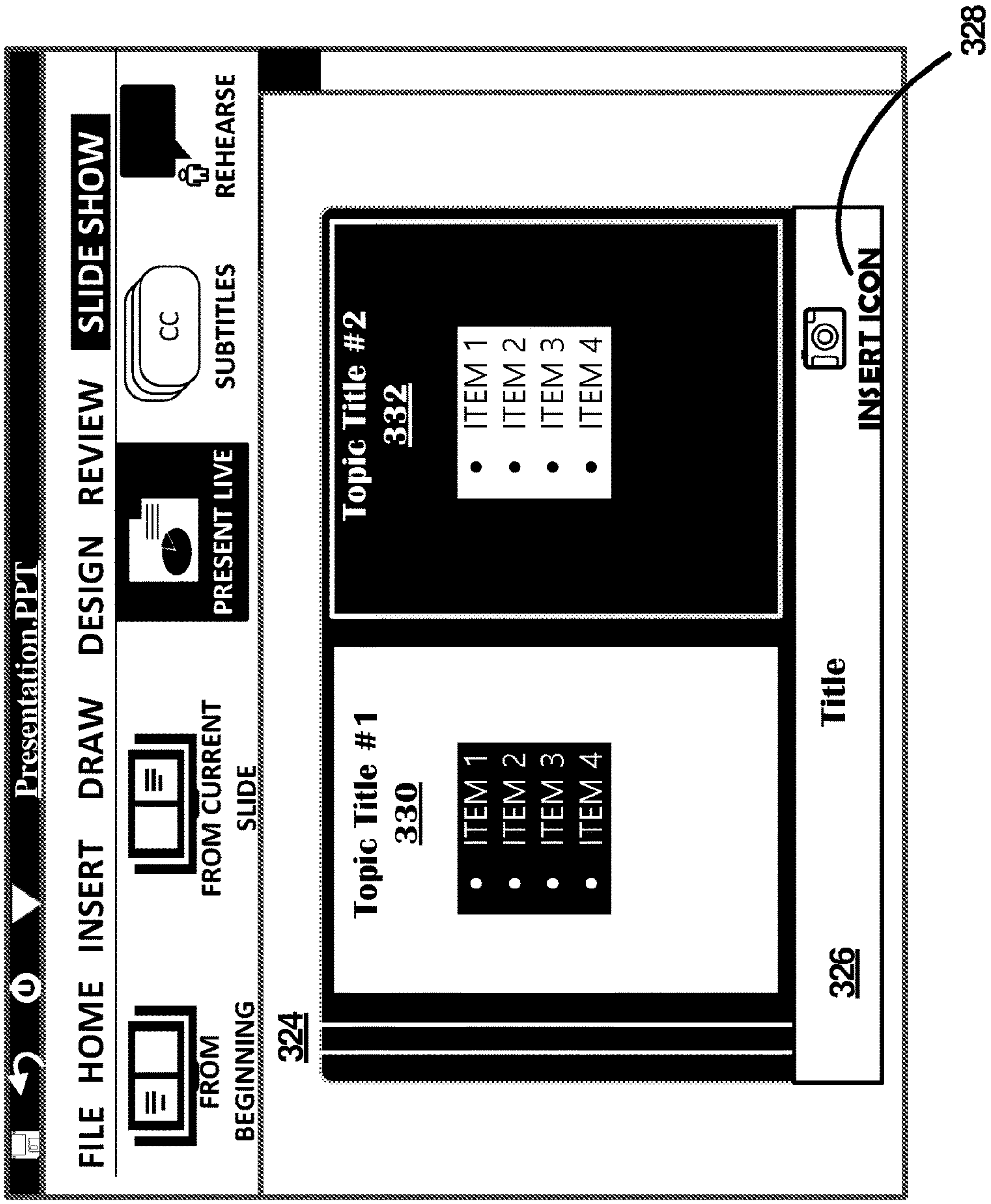
Figure 3C:
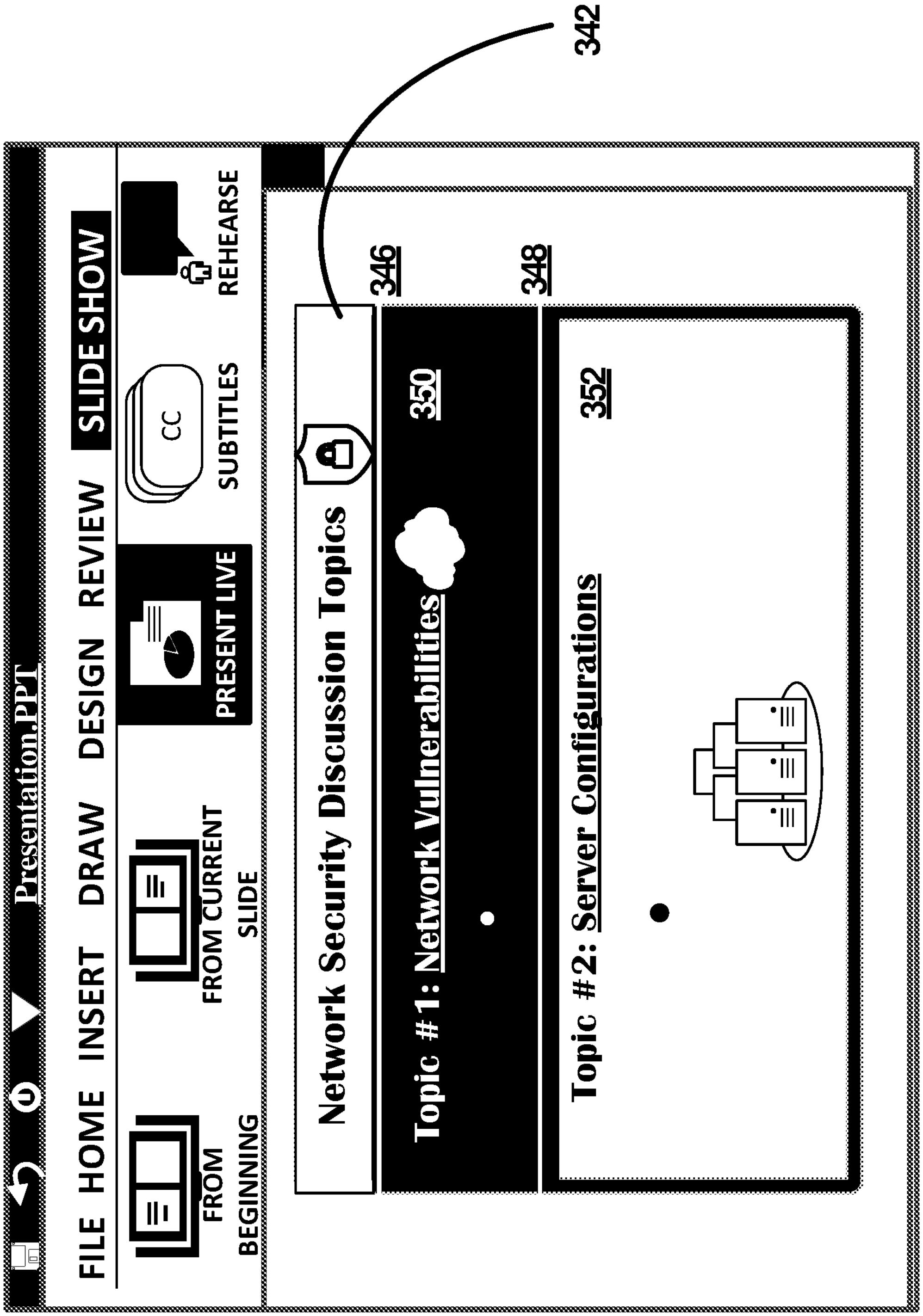

As identified above, the application/service component 104 is configured to provide data for user access to an application or service including provision of a GUI for user access to an application or service. For instance, representations of formatted templates, including transformed templates, may be presented through a GUI of a presentation application or service (e.g., slide-based presentation application or service). Non-limiting examples of visual representations of slide-based templates presented through a GUI of a presentation application/service are illustrated in FIGS. 3A-3C. Moreover, a GUI of an application/service may be further improved by providing GUI elements related to the provision of transformed templates. GUI menus may provide listings of any of: transformed templates; presentation themes and associated sets of transformed templates; GUI notifications of new content including newly added transformed templates; and GUI elements enabling users to provide user feedback on formatted templates and presentation themes, among other examples. It if further to be understood that the application/service component 104 may enable interfacing between applications/services so that notifications can be provided through a GUI of any type of application or service including one that is different from that in which formatted templates are accessed. For example, transformed templates may be added for GUI presentation through a slide-based presentation application or service, where a notification of that added content may be provided through another modality (e.g., email, messaging, collaborative communication application/service, intelligent assistant, operating system (OS) notification).

Exemplary applications/services, provided by the application/service component 104, may interface with other components of system diagram 100 to enhance processing efficiency and functionality as described herein. For instance, the application/service component 104 is configured to interface with a user computing device(s) 102 as well as the formatted template generation component 106, component for implementation trained AI processing 108 and knowledge repositories 110 (e.g., of a distributed software platform). In doing so, signal data may be collected and analyzed one or more of: the application/service component 104; the formatted template generation component 106, component for implementation trained AI processing 108 and, knowledge repositories 110, to enable contextual processing that may aid timing determinations comprising but not limited to: a determination as to when to update a listing of formatted templates (e.g., based on lifecycle determinations of templates, telemetric usage analysis and/or user feedback): determinations as to when to surface notifications of transformed templates that were automatically generated for users (e.g., based on analysis of user activity); and determinations as to when to update trained AI processing (e.g., re-train deep learning modeling with respect to specific features of formatted templates). Non-limiting examples of signal data that may be collected and analyzed comprises but is not limited to: device-specific signal data collected from operation of one or more user computing devices 102; user-specific signal data collected from specific tenants/user-accounts with respect to access to any of: devices, login to a distributed software platform, applications/services, etc.; and application-specific data collected from usage of applications/services. In further examples, analysis of signal data may comprise identifying correlations and relationships between the different types of signal data, where telemetric analysis may be applied to generate the above identified timing determinations.

The formatted template generation component 106 is one or more components configured for management of processing operations related to automatic generation of transformations of formatted templates. In doing so, the formatted template generation component 106 may be configured to execute any processing operations described herein, including those described in process flow 120 (FIG. 1B), process flow 160 (FIG. 1C), method 200 (FIG. 2), and processing associated with visual diagrams of FIGS. 3A-3C. Non-limiting examples of types of processing operations executed by the formatted template generation component 106 comprise but are not limited to: management of data associated with a library of pre-existing formatted templates (e.g., stored on a distributed data storage); managing a lifecycle of formatted templates and/or presentation themes with respect to usage through applications/services; identifying/selecting formatted templates for training of AI processing; management of feature data of formatted templates (e.g., slide-based templates); executing pre-processing of formatted templates including extracting feature data from formatted templates and propagating feature data to the trained AI processing; interfacing with the trained AI processing to enable generation of transformations (e.g., transformed templates) of formatted templates; selecting a configuration of deep learning modeling to apply for generation of transformed templates; selection of an encoder network/decoder network configuration (e.g., selection of a number of encoders and/or decoders to apply); applying weighting to specific features/attributes based on the type of formatted template being evaluated; management of trained AI processing for generation of transformation of formatted templates (e.g., transformed templates) including management of discriminators usable by the trained AI processing; managing template creation guidance including setting and managing formatting rules applicable for generation of transformed templates; management of rules for scoring a relevance/ranking of transformed templates for provision to a user (e.g., addition to a library of pre-existing formatted); executing post processing transformation of formatted templates including application of processing to refine transformation results and conversion of transformation results back to consumable templates; executing one or more levels of quality review of a transformed template; updating the trained AI processing based on template guidance from users (e.g., developers and/or end users); and interfacing between the formatted template generation component 106 and other components of system diagram 100 including user computing devices 102, the application/service component 104, the component for implementation of trained AI processing 108; and knowledge repositories 110, among other examples. It is further to be recognized that an order of execution of processing operations by the contextual insight generation component 106 may vary without departing from the spirit of the present disclosure.

As identified in the foregoing, the formatted template generation component 106 is configured to manage feature data pertaining to formatted templates. For instance, features or attributes associated with a slide-based template may be identified and usable to train the AI processing for real-time (or near real-time) automatic transformation of formatted templates. A point of novelty of the present disclosure is that AI processing is adapted for the specific purpose of automatic generation of transformations of formatted templates, which results in the generation of transformed templates. By training deep learning models on feature data of formatted templates, the trained AI processing is transformed over traditional machine learning applications and able to generate the best possible transformations of formatted templates.

Moreover, the specific features (attributes) of formatted templates that are used for training (and subsequent transformation) of the formatted templates further make the present disclosure novel as compared with traditional methods of template transformation. As a non-limiting example, feature (or attribute) data of a formatted template comprises shape information of objects comprised in a formatted template (or set of formatted templates). Non-limiting examples of shape information comprise but are not limited to: shape position information of objects presented in formatted templates; shape type; shape fill type; shape color; and shape layering/grouping, among other examples. From testing of generative modeling, as related to the present disclosure, it is found that pure generative modeling struggles with management of features such as shape position information often resulting in the creation of usable variations of formatted templates. For instance, objects may be set in an incongruous arrangement. Further, objects having lines that are not straight may be difficult to transform, especially when objects are being considered in aggregate to arrange an entire layout of a formatted template.

As identified in the foregoing, trained AI processing can further be trained based on a presentation theme associated with a formatted template. This is yet another novel manner by which AI processing can be trained and specialized to work with formatted templates such as slide-based templates. An exemplary presentation theme is a collective set of visual style attributes that are applied to a formatted template (e.g., slide-based template). Non-limiting examples of visual style attributes of a theme that may be usable to train AI processing, and subsequently modifiable to effect transformation of one or more formatted templates, comprise but are not limited to: predefining layout attributes (e.g., grouping and/or layering of objects); colors scheme (including color scheme for a background of a slide); fonts (e.g., color, type, size); and visual effects, among other examples.

The formatted template generation component 106 may be further configured to manage signal data to aid decisioning making processing that yields determinations made thereby. As an example, the formatted template generation component 106 is configured to select (or curate) formatted templates/sets of formatted templates for training processing as well as real-time (or near real-time) generation of transformed templates. Non-limiting examples of determinations that may factor in analysis of signal data comprise but are not limited to: determining what formatted templates to utilize for training processing; determining what formatted templates to utilize for generation of transformations; determining what transformations to present to a user; determining a lifecycle state of a formatted template and/or presentation theme; and determining a timing of when to present a transformation or notification thereof to a user. Examples of signal data have been described in the foregoing description. In one instance, user-signal data may be provided with respect to user feedback on specific formatted templates. User feedback may be useful to identify formatted templates and presentation themes that are popular amongst user as well as those that are not favored. Such data is useful to help select specific formatted templates and/or presentation themes that may be utilized to generate transformed templates. Yet another example of signal data that is useful to evaluate is application-specific signal data pertaining to usage of formatted templates. Signal data pertaining to usage of formatted templates may be retrieved directly from an application or service or provided as telemetry data generated based on analysis of usage of an application or service. In some examples, analysis of signal data may be investigated at a specific level (e.g., user level, group level, device level). In that way, the formatted template generation component 106 can help identify transformed templates that may be most contextually relevant to a user and provide the same to the user through an application/service. For instance, a transformed template may be extremely relevant to (or preferred by) a user and a different transformed template may be most relevant to another user.

The formatted template generation component 106 may be further configured to manage a lifecycle of formatted templates and/or presentation themes. A lifecycle of a formatted template refers to a state of usage of the formatted template. A state of a formatted template that is in usage may be derived to help identify a timing as to when to update a library of pre-existing formatted templates. A library of formatted templates may be maintained in a data storage (e.g., distributed data storage), which an application/service can access to provide representations of formatted templates for user usage through a GUI of an application/service. While it may be that any and all types of formatted templates may remain accessible for users, there may also be instances where it makes sense to add new templates (or themes) for users and/or retire some formatted templates and/or presentation themes. For instance, a formatted template (or theme) may not be used very often or simply be unpopular with users. As such, the formatted template generation component 106 can evaluate factors to determine whether a library of pre-existing formatted templates should be updated. Update to a library of formatted templates may comprise but is not limited to: adding new transformed templates to the library and/or removing/replacing templates that be may be older, less popular, etc.

The lifecycle of the formatted template (or presentation theme) may be derived from analyzing one or more of: a period of time that the formatted template has been in usage; a frequency of usage of the formatted template; and a popularity of the formatted template. Tracking of a time period that a template has been in usage may be an important indicator as to when it may be time to add new templates to the library and/or remove a template from usage. Developers may set variance time periods as checkpoints to identify a point in a lifecycle of formatted templates. A time period associated with a lifecycle of a formatted template may be set by developers and vary without departing from the spirit of the present disclosure. Furthermore, user interactions with formatted templates may be evaluated to generate a determination as to a state of a formatted template. User-signal data, application-specific signal data and/or telemetry data derived from usage of formatted templates may be analyzed to determine how often formatted templates are used. The same data may be used to help determine popularity of formatted templates as well as user feedback directly provided with respect to formatted templates (e.g., GUI feedback related to formatted templates including likes/dislikes) and user feedback indirectly provided (e.g., through other applications/services such a social networking applications/services, discussion in messaging/email about the formatted template or theme).

In some examples, a lifecycle of a formatted template may be automatically managed, where developers can set a metric (as identified above) to determine a state of a formatted template, relative to the lifecycle. Processing can then proceed to automatically notify developers as to that state of a formatted template. In one technical instance, the formatted template generation component 106 may interface with the component for implementation of trained AI processing 108 to automatically identify a state of formatted template relative to the lifecycle. For example, an AI model may be trained to execute classification processing that is configured to classify the state of formatted templates within a library of formatted templates. Metrics such as a time period that the formatted template has been in usage, the frequency of usage, the popularity, etc., may be determined and used to generate a classification of the state of formatted template. In at least one example, the lifecycle determination of a state of a formatted template may comprise generating a scoring metric that corresponds to the above described classification. In some cases, a weighting may be applied to specific aspects to help truly judge whether it may be time to retire a formatted template. For instance, a higher weighting may be applied to metrics related to usage as some formatted templates may be in use for a long period of time but remain very popular. However, it is to be understood that developers can set a weighting as they see fit without departing from the spirit of the present disclosure. Non-limiting examples of AI modeling that may be adapted to generate classification ranking/scoring as described herein are provided in the subsequent description of the component for implementation of trained AI processing 108.

In one example, automatic management of a lifecycle of formatted templates may comprise generating a report that provides identification of states of formatted templates. The report can be periodically reviewed by developers. In another example, processing to generate transformations of formatted templates and/or presentation themes may occur automatically based on a result of this lifecycle analysis. That is, indication of a state of a formatted template through the lifecycle analysis may be a trigger for executing of processing to generate transformations of formatted templates and/or presentation themes.

In any example, the formatted template generation component 106 is configured to select (or curate) formatted templates for training processing as well as real-time (or near real-time) generation of transformed templates. In some examples, the formatted template generation component 106 may employ the component for implementation of trained AI processing 108 to aid with curation of formatted templates for training and/or generation of transformed templates. For instance, an AI model can be trained to execute a relevance ranking which can be applied to identify the most relevant formatted templates and/or presentation themes from the library of formatted templates. In at least one example, generation of the relevance ranking may comprise generating a scoring metric that corresponds to the relevance of formatted template, set of formatted templates, and/or presentation theme. An AI model may be trained to analyze signal data related to usage of formatted templates or the like. Another aspect that can be analyzed to generate a scoring metric for the relevance ranking is the determination of the lifecycle state of the formatted template. In some cases, a weighting may be applied to specific metrics to help contextually understand a relevance of a formatted template. However, it is to be understood that developers can set a weighting as they see fit without departing from the spirit of the present disclosure. Non-limiting examples of AI modeling that may be adapted to generate relevance ranking/scoring as described herein are provided in the subsequent description of the component for implementation of trained AI processing 108.

It is to be understood that the present disclosure provides an extensible solution that is configured to work with any number of formatted templates/sets of formatted templates/presentation themes that are selected for transformation. In some instances, transformation of formatted templates may occur iteratively and in other cases multiple transformations may be occurring concurrently. It is further understood that processing described herein is applicable to work with any type of formatted template. While one example is a slide-based template that is usable to render a slide-based presentation, other types of formatted documents may comprise but not limited to: word processing templates; spreadsheet templates; web templates; notes templates; diagramming and illustration templates; portable document format (PDF) templates; and any other types of templates as known to one skilled in the field of art. Once the formatted template generation component 106 selects one or more formatted templates and/or presentation themes, the formatted template generation component 106 may interface with the component for implementation of trained AI processing 108 to enable processing that transforms formatted templates.

The component for implementation of trained AI processing 108 is one or more components configured for automatic generation of transformations of formatted templates. This processing includes the generation of transformed templates or sets of transformed templates that are usable to enable users to build presentation documents (e.g., slide-based presentations). In some alternative examples, the component for implementation of trained AI processing 108 may be configured to generate transformations strictly of presentation themes using processing similarly described herein. Presentation themes can be stored and managed in the same manner as described with respect to formatted templates.

As identified in the foregoing, the trained AI processing of the present disclosure is configured to comprehensively apply deep learning modeling. Rather than simply relying one type of deep learning model which may have its strengths and weaknesses, multiple deep learning models can be applied to provide the most comprehensive and most accurate templatized transformations. For instance, trained AI processing may apply two or more different types of trained generative deep learning models to provide the best possible transformations of formatted templates. Modeling that relies on pure random generation may struggle due to the sparseness of datapoints in a latent space. As such, trained AI processing is conditioned for guided generation and style transfer of formatted templates. Non-limiting examples of the two or more types of trained generative deep learning models comprise but are not limited to: one or more VAEs; one or more GANs; one or more GPTs; and one or more Deepfake learning models.

In one example, different deep learning models may be trained on different features/attributes of formatted templates (e.g., one model on shape position information and another model on visual style attributes). In other examples, multiple different types of deep learning models may be trained to focus on the same feature/attribute (e.g., shape position information) of a formatted template. Any arrangement of modeling described herein may be applied to effect the best possible transformations. In some cases, a selection as to how many iterations of different modeling is to be applied may pertain to a determination as to a timing requirement for returning results. That determination may be made based on whether transformed templates are being asynchronous from user request for formatted templates. In one instance where processing is not time sensitive (e.g., occurring asynchronous to user access and request for content), transformed template candidates may be generated through application of each off: a conditioned VAE, a conditioned GAN and a conditioned GPT. Results may further be propagated to a Deepfake learning model to effect further transformed template candidates. In other technical instances where process is time sensitive (e.g., results need to be provided in real-time or near real-time), processing described herein may selectively determine a number (and order) of deep learning models to apply that fit within time constraints for working with specific applications/services (e.g., latency requirements of an application/service). In some technical examples, multiple sets of each type of generative deep learning model may be applied. For instance, a first VAE set (e.g., encoder/decoder) may be trained on formatted templates having a first presentation theme and a second VAE set (e.g., encoder/decoder) may be trained on formatted templates having a second presentation theme. In one non-limiting example, any of a VAE, GAN or GPT may be utilized to generate transformation of a layout position/arrangement of objects of a formatted template and a Deepfake learning model may be utilized to generate an exemplary style transformation. In any example, trained AI processing is improved by conditioning applied deep learning models based on feature data of formatted templates (e.g., shape position information of objects thereof).

In cases where trained AI processing is applied, general application of trained AI processing including creation, training and update of generative deep learning modeling is known to one skilled the field of art. Above what is traditionally known, trained AI processing may be adapted to execute specific determinations described herein with reference to conditioning deep learning modeling for automatic generation of transformations of formatted templates. As previously identified, trained AI processing is uniquely conditioned based on feature data associated with formatted templates. Non-limiting examples of feature data have been provided in the foregoing description.

Feature data pertaining to one or more formatted templates and/or presentation themes may be a component of exemplary training data that is used to train exemplary modeling of the trained AI processing. Training data, as referenced herein, is intended to cover data derived from analysis of feature data of formatted templates as well as formatting rules specific to the type of formatted template that is being transformed. Exemplary formatting rules may be set by developers, where the formatting rules are specific to a type of formatted template that is being transformed (e.g., slide-based templates). Non-limiting examples of formatting rules for formatted templates may comprise but are not limited to rules for: transforming specific types of objects including modification of specific shape types and shape position information; layout/arrangement rules for congruity between object types (e.g., using shape position information of respective objects); prioritization of specific types of objects (e.g., titles, headings; headers, footers, content specific listings/bullet points); spacing between objects; line breaks; indentation and justification; font formatting; fill type for specific objects; fill color for specific objects; visual effects; application of visual style attributes associated with a presentation theme; insertion of object placeholders; number of formatted templates to present in a set of formatted templates; applicability of visual style attributes with respect to objects (e.g., shape position information) of a formatted template; user preferences (e.g., user-specific formatting representations); and object sharpening and/or line straightening, among other examples.

The formatting rules may be utilized to condition encoder and decoder networks and/or discriminators for generating transformed templates that satisfy the formatting rules, when evaluating formatted templates. General application of formatting rules for training of a generative deep learning model are known to one skilled in the field of art. Above what is traditionally known, the present disclosure applies formatting rules specific to formatted templates (e.g., slide-based templates). In one technical example, one or more layers of a deep learning network are manipulated such that individual layers may store a set of one or more formatting rules. An output may be determined from an association between keys, denoting meaningful context, with values when formatted templates are utilized to train the AI processing. For instance, consider an example where formatting rules are set indicating a layout/arrangement of a formatted template to foster congruity between object types (e.g., using shape position information of respective objects). A distribution from latent space analysis may utilize shape information, including shape position information of respective objects, to transform positional layout of objects for a formatted template. Training, based on formatting rules that foster congruity between objects, may direct a transformation of objects) in a manner that is optimal for a representation in a formatted template (e.g., slide-based template), where the formatting rules may be utilized to identify preferred arrangements of objects and/or avoid certain arrangements of objects.

As a non-limiting example of how formatting rules may be applied to improve generation of transformed template, consider the following. Analysis of shape information of specific object types of a formatted template may identify the inclusion of a rectangular title box (for a title of a slide-based template) and two or more square slide content portions, among other types of objects. Further, shape position information for those respective objects may be identified indicating positional placement within a formatted template. An exemplary formatting rule (or rules) may be applied that trains a deep learning model of the AI processing to reposition the rectangular title box in a prioritized location (e.g., top of slide or bottom of slide) and in manner that does overlap with the two or more square slide content portions. Further, if the formatted template should include other objects (e.g., visible line breaks, visual effects, etc.), formatted rules may help identify potential modification thereof to foster congruity with the objects presented in the formatted template (based on analysis of shape information thereof). For instance, a visible line break may have originally be positioned horizontally between the rectangular title box and the two or more square slide content portions, where a transformation based on formatting rules may identify that this visible line break should keep separation therebetween whether the object of the visible line break is transformed in a vertical direction or repositioned at a different location and remaining in a horizontal arrangement.

In some instances, formatting rules may specify whether to add/remove object types based on identified shape position information. A layout of a formatted template can be improved to add more object items in a case where user feedback provided as formatted template guidance indicates that a layout of a formatted template can be improved. In other examples, formatting rules may be set to train a deep learning model to maintain certain spacing between objects (e.g., based on analysis of shape position information for objects being included in a transformation). In additional examples, formatting rules can help identify technical instances where a shape of different objects can be changed within the parameters of a specific formatted template (e.g., slide-based template). In one example, a shape of an object such as rectangular title box may be changed to different shape (e.g., square, hexagon, triangle) if the formatting rules enable this when the entirety of objects for a formatted template are considered (e.g., objects and shape position thereof is being considered collectively).

In some alternative examples, a specific learning model is trained to curate decoding results of transformed templates after raw results are generated. For instance, one or more decoder networks may generate results for transformed templates and a relevance ranking may be applied to determine which results are the best candidates for presentation to users. Exemplary relevance ranking evaluates the decoding results from the lens of applicable formatting rules. In at least one example, generation of the relevance ranking may comprise generating a scoring metric that corresponds to the relevance of a transformed template (candidate) with respect based on formatting rules specific to the type of template (e.g., slide-based templates). In some cases, a weighting may be applied to specific formatting rules to help contextually understand a relevance of a formatted template. However, it is to be understood that developers can set a weighting as they see fit without departing from the spirit of the present disclosure. Non-limiting examples of AI modeling that may be adapted to generate relevance ranking/scoring as described herein are provided in the subsequent description of the component for implementation of trained AI processing 108.

Exemplary AI processing may be applicable to aid any type of determinative or predictive processing including specific processing operations described about with respect to determinations, classification ranking/scoring and relevance ranking/scoring. Encoders, decoders and discriminators, described herein may be trained AI modeling that is specifically configured for the purposes described herein. This may occur via any of: supervised learning; unsupervised learning; semi-supervised learning; or reinforcement learning, among other examples. Non-limiting examples of supervised learning that may be applied comprise but are not limited to: nearest neighbor processing; naive bayes classification processing; decision trees; linear regression; support vector machines (SVM) neural networks (e.g., deep neural network (DNN) convolutional neural network (CNN) or recurrent neural network (RNN)); and transformers, among other examples. Non-limiting of unsupervised learning that may be applied comprise but are not limited to: application of clustering processing including k-means for clustering problems, hierarchical clustering, mixture modeling, etc.; application of association rule learning; application of latent variable modeling; anomaly detection; and neural network processing, among other examples. Non-limiting of semi-supervised learning that may be applied comprise but are not limited to: assumption determination processing; generative modeling; low-density separation processing and graph-based method processing, among other examples. Non-limiting of reinforcement learning that may be applied comprise but are not limited to: value-based processing; policy-based processing; and model-based processing, among other examples.

In any example, an output of trained AI processing is a consumable formatted template. In some examples, this may require post-processing operations, as subsequently described, to improve the result and put the transformed template in a form that is ready for presentation to users. The formatted template generation component 106 may interface with distributed data storage to store transformed templates for recall, for example, in a library of formatted templates.

As referenced in the foregoing description, knowledge repositories 110 may be accessed to obtain data for generation, training and implementation of the component for implementation of trained AI processing 108 as well the operation of processing operations by that of the application/service component 104 and the formatted template generation component 106. Knowledge resources comprise any data affiliated with a software application platform (e.g., MICROSOFT®, GOOGLE®, APPLE®, IBM®) as well as data that is obtained through interfacing with resources over a network connection including third-party applications/services. Knowledge repositories 110 may be resources accessible in a distributed manner via network connection that may store data usable to improve processing operations executed by the formatted template generation component 106. Examples of data maintained by knowledge repositories 110 comprises but is not limited to: collected signal data (e.g., from usage of an application or service, device-specific, user-specific); telemetry data including past usage of a specific user and/or group of users; corpuses of annotated data used to build and train AI processing classifiers for trained relevance modeling; access to entity databases and/or other network graph databases; web-based resources including any data accessible via network connection including data stored via distributed data storage; trained bots including those for natural language understanding; data for stored formatted templates including transformed templates (e.g., a library of formatted templates); and application/service data (e.g., data of applications/services managed by the application/service component 104) for execution of specific applications/services including electronic document metadata, among other examples. Moreover, knowledge repositories 110 may further comprise access to a cloud-assistance service that is configured to extend language understanding processing including user context analysis. The cloud-assistance service may provide the formatted template generation component 106 and/or application/service component 104 with access to larger and more robust library of stored data for execution of language understanding/natural language understanding processing. Access to the cloud-assistance service may be provided when an application or service is accessing content in a distributed service-based example (e.g., a user is utilizing a network connection to access an application or service), as the data of the cloud-assistance service may be too large to store locally. In further examples, the formatted template generation component 106 may be configurable to interface with a web search service, entity relationship databases, etc., to extend a corpus of data to make the most informed decisions when generating determinations for improving automatic generation of transformations of formatted templates. In further examples, telemetry data may be collected, aggregated and correlated (e.g., by an interfacing application or service) to further provide the formatted template generation component 106 with on-demand access to telemetry data which can aid determinations generated thereby.

Figure 1B:
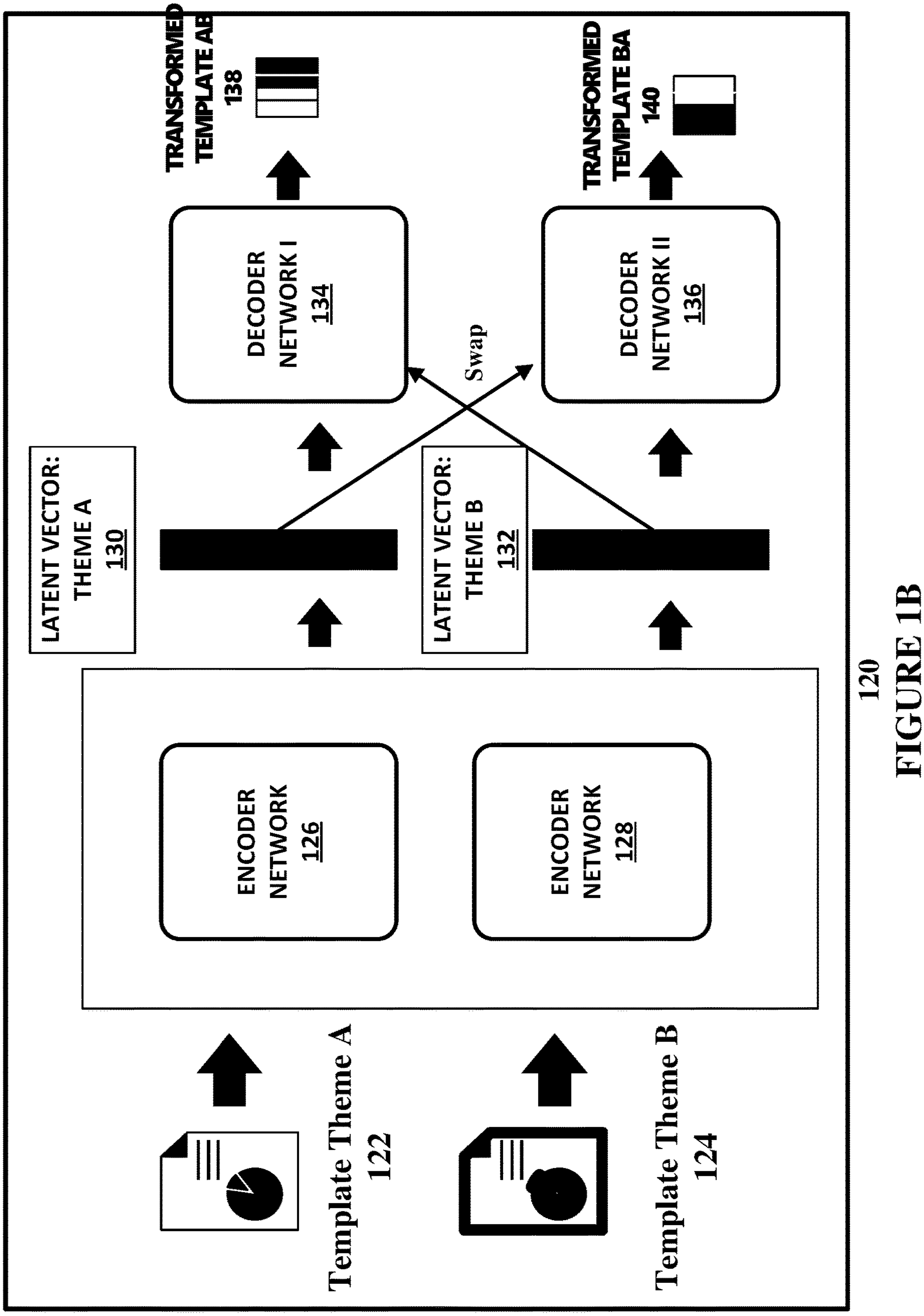
FIG. 1B illustrates an exemplary flow diagram of processing related to automatic generation of transformations of formatted templates associated with specific presentation themes, with which aspects of the present disclosure may be practiced.

FIG. 1B illustrates an exemplary flow diagram 120 of processing related to automatic generation of transformations of formatted templates associated with specific presentation themes, with which aspects of the present disclosure may be practiced. Flow diagram 120 illustrates non-limiting examples of processing executed by trained AI processing to automatically generate transformed templates. For instance, processing of flow diagram 120 may be executed by the component for implementation of trained AI processing 108 as described in the description of system diagram 100 (FIG. 1A).

Flow diagram 120 begins with the identification of formatted templates for two or more different templatized themes (e.g., presentation themes as previously described). Templatized theme A 122 is intended to represent a first set of one or more formatted templates that are associated with a first presentation theme. Templatized theme B 124 is intended to represent a second set of one or more formatted templates that are associated with a second presentation theme. Exemplary presentation themes and attributes associated therewith have been described in the foregoing description of the present disclosure.

As shown in flow diagram 120, data for each of templatized theme A 122 and templatized theme B 124 are separately analyzed, where a first encoder network 126 may be utilized to encode feature data related to one or formatted templates associated with templatized theme A 122, and a second encoder network 128 may be utilized to encode feature data related to one or formatted templates associated with templatized theme B 124. In some examples, the first encoder network 126 and the second encoder network 128 may be the same encoder network. For instance, the trained AI processing may be configured to utilize one encoder network for feature extraction and latent vector generation and subsequently use two different decoder networks to generate transformed templates for formatted templates associated with respective presentation themes. In another example, the first encoder network 126 and the second encoder network 128 may be different encoder networks. In some examples, exemplary encoder networks and decoder networks may be set as neural networks and iteratively trained/optimized to learn the best possible encoding-decoding scheme for generating transformations. Developers can configure the trained AI processing in any manner they see fit, including setting a configuration of encoder networks and/or decoder networks. In some examples, multiple different versions of trained AI processing may be generated, where a selective determination as to which to apply can be made at run-time. In most cases, the usage of two different encoder networks, each trained on data for specific presentation themes, produces more stable training and better transformation results.

In any example, encoder networks are charged with extracting feature data for one or more formatted templates associated with the respective presentation theme and encoding that feature data. An encoder network may be a trained AI model such as a neural network model, examples of which have been previously described. Encoder networks of the present disclosure execute data compression, encoding a representation of extracted feature data as compressed data using fewer bits than the original representation). This generates a compact lower dimensional vector (e.g., latent vector) identifying a distributed representation of the feature data of the one or more formatted templates. Encoding processing, including generation of an exemplary latent vector, is known to one skilled in the field of art. Above what it is traditionally known is that the encoding processing of the present disclosure is specifically configured to work with consumable formatted templates and create a unique feature vector (e.g., latent vector) that represents feature data of a specific type of formatted template (e.g., slide-based template).

An exemplary latent vector (or feature vector) is a representation of the encoded (compressed) data. Encoding processing may comprise execution of a plurality of encoding passes. Each encoding pass may vary due to sampling, where an encoding may be generated at random at any point (or points) of a distribution. Encoding feature data of a formatted template as a distribution over a latent space improves generative analysis as the feature data is presented in a form that is less complex and more convenient to process and analyze (and thereby generate transformations). For instance, an exemplary latent space is continuous distribution of data, which enables easier random sampling and interpolation. In turn, this further enables trained generative modeling to understand patterns and structural similarities between data points of a distributed representation. Through interpolation of data in the latent space, a trained decoder network configured to analyze the distribution representation of the feature data and generate transformations of feature data for formatted templates of a presentation theme.

Following flow diagram 120 from processing of template theme A 122 by encoder network 126, a latent vector 130 for feature data associated with template theme A 122 is generated. As previously referenced, latent vector 130 may be a representation of the encoded (compressed) data in the form of a feature vector (dimensional vector). It is to be understood that a feature vector, including latent vector 130, may focus on specific types of feature data of a formatted template. As an example, feature data, extracted from one or more formatted templates associated with a presentation theme, may be shape information of objects associated with the one or more formatted templates thereof. In further examples, a feature vector, such as latent vector 130, may be generated for shape position information associated with objects within a formatted template. For instance, latent vector 130 may be generated for shape position information of one or more formatted templates associated with template theme A 122. Encoder networks (e.g., encoder network 126 and encoder network 128) may further be trained based on specific feature data including shape information (e.g., shape position information) to aid with extraction of specific feature data and generation of a feature vector.

Similarly, following flow diagram 120 from processing of template theme B 124 by encoder network 128, a latent vector 132 for feature data associated with template theme B 124 is generated. Latent vector 132 may be a representation of the encoded (compressed) data for feature data of one or more templates associated with template theme B 124, where a feature vector (dimensional vector) is generated therefor. As an example, feature data, extracted from one or more formatted templates associated with template theme B 124, may be shape information of objects associated with the one or more formatted templates. In further examples, latent vector 132 may be generated to specifically focus on shape position information associated with objects within a formatted template.

Latent vectors described herein may then be propagated to decoder networks for decoding processing. A decoder network may be a trained AI model such as a neural network model as previously described. An exemplary decoder network is configured to decompress the encoded data and reconstruct representations therefrom to return the formatted template to a consumable template. In doing so, a trained decoder network is further able to generate transformations of a formatted template through trained analysis of the latent vector in a latent space (e.g., the distributed representation of feature data). As encodings may be generated at random from anywhere inside the distributed representation, the decoder network learns not only single points in latent space but also nearby points of reference as well. This allows the decoder network to understand and generate a range of variations of encodings during training processing and subsequently in real-time execution.

Decoding processing, including generative analysis of a distribution, is known to one skilled in the field of art. Above what it is traditionally known is that the decoding processing of the present disclosure is specifically configured to work with consumable formatted templates and not only reconstruct a formatted template but also generate transformations of feature data to create transformed templates. As an example, a decoder network may be trained based on training data that comprises feature data for formatted templates associated with a specific presentation theme. This enables the decoder network to become very familiar with visual style attributes that are associated with a specific presentation theme through iterative training. Training data associated with a decoder network may comprise any type of feature data associated with a formatted template as described in the foregoing. In one example, a decoder network is trained based on shape information (e.g., shape position information) of objects associated with formatted templates and further trained based on visual style attributes associated with a specific presentation theme. In some examples, a decoder network may be applied that is trained on the same presentation theme as the encoder network from which it received encoded data (e.g., a latent vector). This can effect transformations in both layout of objects as well as style transformations (e.g., color scheme of presentation theme may be modified/flipped). In cases where a decoder network is trained on formatted template data associated with a specific presentation theme, applying that decoder network to transform formatted templates associated with a different presentation theme may result in even greater transformations of visual style attributes as compared to formatted templates having that original presentation theme.

In the example shown in flow diagram 120, latent vector 130, for feature data associated with template theme A 122, is propagated to decoder network 136 (decoder network II or a second trained decoder network). Decoder network 136 is trained based on training data that comprises feature data for template theme B 124. Latent vector 132, for feature data associated with template theme B 124, is propagated to decoder network 134 (decoder network I or a first trained decoder network). Decoder network 134 is trained based on training data that comprises feature data for template theme A 122. Essentially, decoder networks trained on specific presentation themes are swapped to transform the style of the two themes when generating transformations of formatted templates. This results in transformed templates being generated that mix feature data (e.g. objects and shape information from one formatted template with visual style attributes of another formatted template that is associated with a different presentation theme).

In the example shown in flow diagram 120, a first transformed template 138 (transformed template AB) is generated that comprises: a transformation of objects (e.g., layout and/or type of object) from a formatted template that is associated with template theme A 122; and a style transformation based on visual style attributes associated with template theme B 124. Continuing the example shown in flow diagram 120, a second transformed template 140 (transformed template BA) is generated that comprises: a transformation of objects (e.g., layout and/or type of object) from a formatted template that is associated with template theme B 124; and a style transformation based on visual style attributes associated with template theme A 122.

In some examples, style transformations may be reflective of analysis that mixes visual style attributes associated with each of template theme A 122 and template theme B 124 (e.g., color schemes may be mixed between the two presentation themes). The same concept may apply to object transformations pertaining to layout or object type. Furthermore, as referenced in the foregoing description, encoder networks and decoder networks can be trained on formatted templates for a plurality of presentation themes. This may further diversify transformations and provide an efficient way to generate a plurality of transformed templates.

Figure 1C:
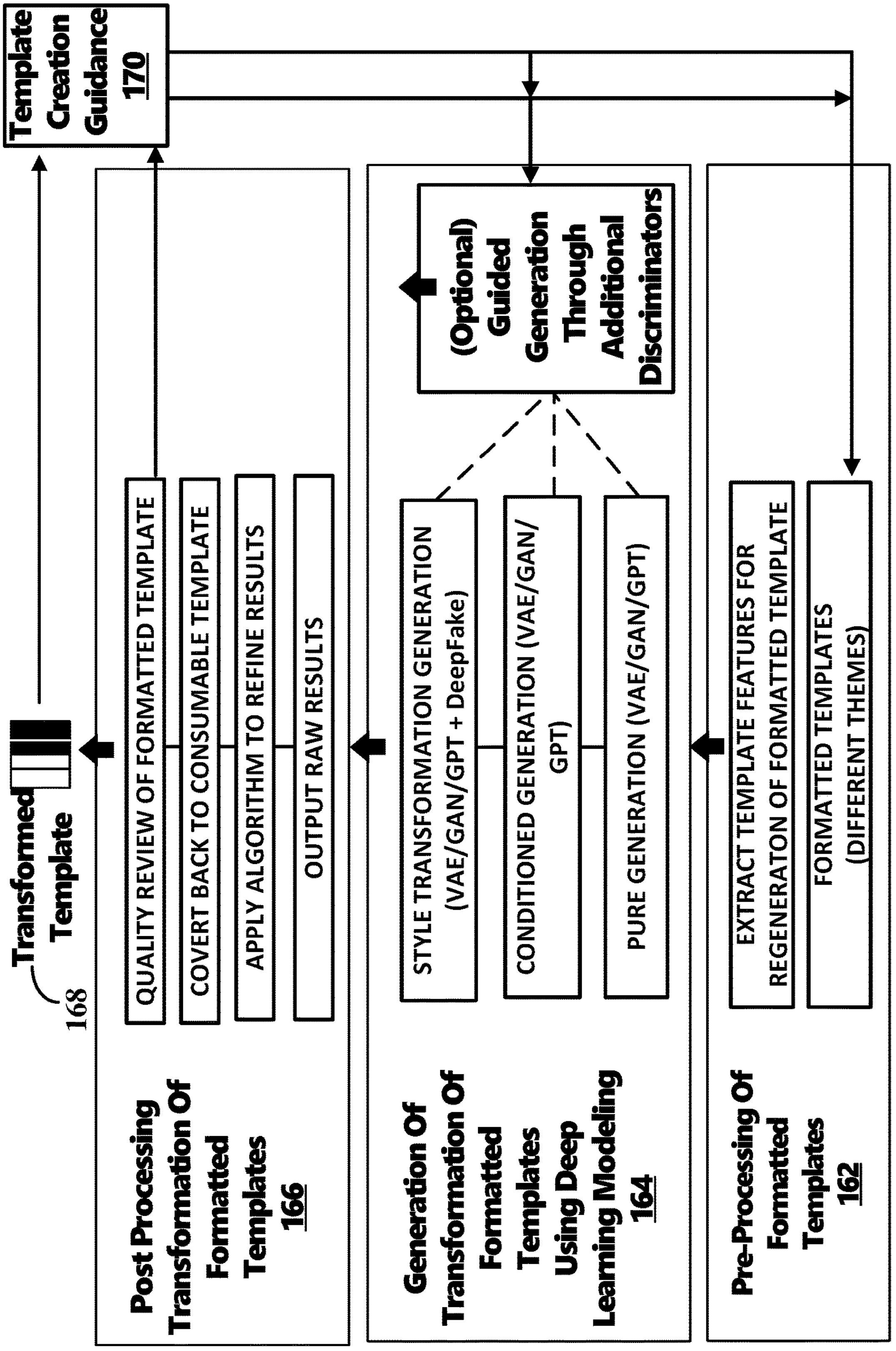
FIG. 1C illustrates an exemplary flow diagram related to automatic generation of transformations of formatted templates, with which aspects of the present disclosure may be practiced.

FIG. 1C illustrates an exemplary flow diagram 160 related to automatic generation of transformations of formatted templates, with which aspects of the present disclosure may be practiced. Flow diagram 160 illustrates non-limiting examples of processing executed by trained AI processing and/or a formatted template transformation component 106 (of FIG. 1A) to automatically generate transformed templates. Flow diagram 160 is intended provide a fuller view of processing phases involved in automated generation of transformed templates from pre-existing formatted templates. Flow diagram 160 is further intended illustrate the comprehensive application of deep learning modeling (as part of the exemplary trained AI processing).

Flow diagram 160 begins with a phase of pre-processing of formatted templates 162 (hereinafter "pre-processing phase 162"). The pre-processing phase 162 is intended to comprise a plurality of processing operations that prepare a formatted template (or presentation theme) for transformation via application of trained AI processing. The pre-processing phase 162 may first comprise identification of one or more formatted templates for transformation. Processing operations related to identification of formatted templates have been described in the foregoing description of system diagram 100 (FIG. 1A), specifically with reference to the formatted template transformation component 106. For instance, formatted templates may be identified and selected/curated for transformation processing. In at least one example, this may comprise analyzing pre-existing formatted templates that are stored in a library of formatted templates. In some examples, this may be a programmed activity that occurs automatically without developers continuously requesting this analysis be executed.

Moreover, the pre-processing phase 162 may further comprise propagating data associated with one or more formatted templates to trained AI processing. In some examples of propagation, this may comprise extracting feature data associated with a formatted template and propagating that feature data to one or more deep learning models that are configured as part of the trained AI processing. As indicated in the foregoing, trained AI processing of the present disclosure is configured to generate transformations of the formatted templates. In other examples, feature extraction of feature data of formatted templates occurs as part of application of the trained AI processing. In that case, data associated a consumable version of formatted template may be propagated to or identified for access to the formatted template.

As previously mentioned, application of trained AI processing may be a comprehensive framework that can apply multiple different generative learning models to generate a variety of transformations. For instance, trained AI processing may apply two or more different types of trained generative deep learning models to provide the best possible transformations of formatted templates. Non-limiting examples of the two or more types of trained generative deep learning models comprise but are not limited to: one or more VAEs; one or more GANs; one or more GPTs; and one or more Deepfake learning models. Components of and processing related to operation of such deep learning modeling is known to one skilled in the field of art. For example, general implementation and training of encoders, decoders and discriminators of generative modeling are known to one skilled in the field of art.

In some cases, an order of application of trained AI processing may be preprogrammed. In other cases, the pre-processing phase 162 comprises processing operations related to selecting a configuration of deep learning models to apply. For instance, a transformation may be occurring on feature data that does not possess many layers of complexity. As an example, trained AI processing may be applied to change a font feature (e.g., color, style, size) that does not require significant model conditioning to achieve. In such cases, it may be practical to selectively apply more lightweight modeling to effect a transformation rather than one that is conditioned on very specific feature data (e.g., shape position information). In some instances, that may comprise applying deep learning modeling that relies on pure random generation. In other technical instances, a pure generation deep learning modeling may struggle with more complex feature data specific to formatted templates due to the sparseness of datapoints in a latent space. As such, there are additional layers of AI processing that are conditioned for guided generation and style transfer of formatted templates.

Other considerations in selection of a specific configuration of trained AI processing may be the run-time circumstance. For instance, a user may request a template transformation in real-time (or near real-time), where execution of a result is expected within a specific time due. Due to processing requirements, there is often latency between the time a request is made, and a result is returned. It may not be feasible to run trained AI processing in preprogrammed configurations for each of a VAE, GAN, GPT and Deepfake learning model. As such, latency requirements of applications/services may be a factor in selecting a configuration of trained AI processing at run-time.

Flow diagram 160 may proceed to a phase for generation of transformed templates using deep learning modeling 164 (hereinafter "generation phase 164"). Occurrence of the generation phase 164 is where a combination of deep learning modeling is applied as trained AI processing to generate transformations of formatted templates. Non-limiting examples of deep learning modeling applied as trained AI processing have been described in the foregoing description. As previously referenced, formatted templates have layers of complexity that made it difficult for traditional unconditioned processing to generate high quality consumable formatted templates. As such, deep learning modeling needs to be properly trained to produce the intended results of the present disclosure. While examples may start with pure generation deep learning modeling, they may be progressively upgraded to condition generative modeling configured for the purpose of generating transformations of feature data of formatted templates (e.g., slide-based templates). Examples of training of AI processing, including training data used to condition generative modeling, have been described in the foregoing description. In one example, the generation phase 164 may apply one of: a VAE, GAN or GPT to generate transformations of objects (e.g., a layout or arrangement of objects) for a transformed template; and further apply a Deepfake learning model to add a layer of style transformation to the transformed template. As such, high quality representation of transformed templates can be automatically generated via the configuration of the trained AI processing as applied in the present disclosure.

Furthermore, the generation phase 164 may be optionally configured to apply discriminators to curate transformed templates that are generated by respective deep learning modeling. Similar to the encoder and decoder networks, discriminators may be trained for the purpose of formatted template analysis. In doing so, discriminators are trained specifically for the purpose of evaluating the quality of the transformation of a formatted template. For example, a trained discriminator may attempt to determine if the formatted template being judged is fake or real. The trained discriminator may act as a curator to determine which transformed templates are high quality enough for presentation to users. The subset of transformed templates that do not satisfy a threshold set by a discriminator are discarded. Thresholds for discriminators may vary according to developer specifications, where the present disclosure is intended to cover any threshold for evaluating quality of a transformed template. In some instances, user feedback may be utilized to train a discriminator to identify high quality transformation (e.g., is the formatted template real or fake). As a starting point, user feedback provides a baseline for judging the accuracy of a generation result. As discriminators may be set as learning models, they may intelligently learn and update over time to better adapt to the complexities of formatted templated. In further examples, discriminators may be trained based on formatting rules of formatted templates. Examples of formatting rules have been provided in the foregoing description. Discriminators trained based on formatting rules may periodically change, where formatting rules may be adapted over time by developers based on template creation guidance received from users (e.g., end users and/or developers). Optional discriminators may further be added and trained at the discretion of the developers.

Once one or more transformed templates have been generated, flow diagram 160 may proceed to a post-processing phase 166 (hereinafter "post processing phase 166"). The post processing phase 164 of flow diagram 160 may be configured to generate consumable formatted templates as transformed templates. While those transformed templates may be high quality, they may not be perfect and presentation ready. As such, the post-processing phase 166 may comprise processing operations to refine the transformed templates for presentation purposes. Any of the trained AI processing, the formatted template transformation component 106 (of FIG. 1A), or a combination thereof, may be utilized to apply a programmed algorithm to refine transformed templates for presentation.

As a starting point to the post-processing phase 166, the trained AI processing may be configured to output raw results from transformation of a formatted template. The raw results may then be evaluated using a programmed algorithm that is configured to automatically refine the raw results from transformation of a formatted template. The algorithm for refinement may be programmed to evaluate various aspects of transformations under the lens of the formatting rules for formatted templates (previously described). Modifications to the transformed template may be made based on a result of applying the algorithm for refinement. For example, imaging associated with objects may be sharpened (including lines and edges).

Once refinement is completed, updated raw results may be converted back to a consumable formatted template. At that point, the transformed template is ready for quality review. In many instances, quality review may be a manual review process by users (e.g., developers and/or end users). In some examples, transformed templates may be previewed in a GUI of an application or service so that end users can provide feedback as to whether they like/dislike the transformed template. Quality review may further comprise identifying comments, criticisms, suggestions etc., all of which can be propagated as template creation guidance 170 that can be utilized to: update/train deep learning modeling of the trained AI processing; help developers determine how to manage a library of formatted templates; and help developers curate formatted templates for subsequent transformation, among other examples. If a transformed template 168 passes quality review, the transformed template 168, may be output for storage and subsequent presentation. A lifecycle of the transformed template 168 may then be tracked as previously described in the description of system diagram 100 (FIG. 1A).

Figure 2:
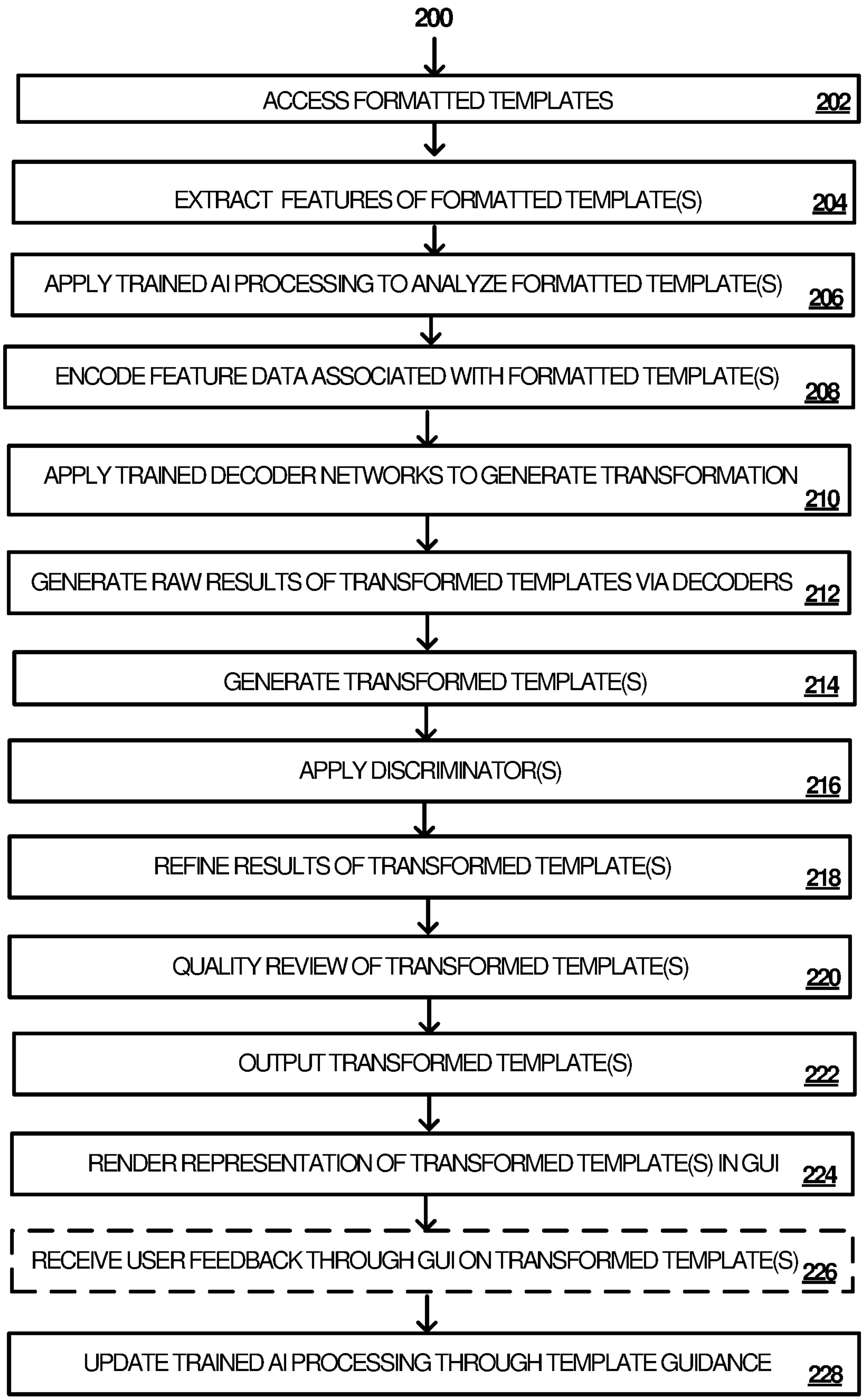
FIG. 2 illustrates an exemplary method related to automatic generation of transformations of formatted templates, with which aspects of the present disclosure may be practiced.

FIG. 2 illustrates an exemplary method 200 related to automatic generation of transformations of formatted templates, with which aspects of the present disclosure may be practiced. As an example, method 200 may be executed across an exemplary computing system 401 (or computing systems) as described in the description of FIG. 4. Exemplary components, described in method 200, may be hardware and/or software components, which are programmed to execute processing operations described herein. Non-limiting examples of components for operations of processing operations in method 200 are described in system diagram 100 (FIG. 1A), and processing operations executed thereupon further comprise those described in the description of flow diagram 120 (FIG. 1B) and flow diagram 160 (FIG. 1C). Processing operations performed in method 200 may correspond to operations executed by a system and/or service that execute computer modules/programs, software agents, application programming interfaces (APIs), plugins, AI processing including application of trained data models, intelligent bots, deep learning modeling including neural networks, transformers and/or other types of machine-learning processing, among other examples. In one non-limiting example, processing operations described in method 200 may be executed by a component such as the formatted template transformation component 106 (of FIG. 1A) and/or a component for implementation of trained AI processing 108. In distributed examples, processing operations described in method 200 may be implemented by one or more components connected over a distributed network. For example, components may be executed on one or more network-enabled computing devices, connected over a distributed network, that enable access to user communications.

Method 200 begins at processing operation 202, where data for formatted templates is accessed. Processing operations related to identification of formatted templates have been described in the foregoing description of system diagram 100 (FIG. 1A), flow diagram 120 (FIG. 1B) and flow diagram 160 (FIG. 1C). For instance, formatted templates may be identified and selected/curated for transformation processing. In at least one example, this may comprise analyzing pre-existing formatted templates that are stored in a library of formatted templates. In some examples, this may be a programmed activity that occurs automatically without developers continuously requesting this analysis be executed.

Flow of method 200 may then proceed to processing operation 204, where feature data associated with a formatted template is extracted. Processing operations related to extraction of feature data have been described in the foregoing description of system diagram 100 (FIG. 1A), flow diagram 120 (FIG. 1B) and flow diagram 160 (FIG. 1C). As a non-limiting example, feature data comprises shape information. Non-limiting examples of shape information comprise but are not limited to: shape position information of objects presented in the first slide-based template; shape type; shape fill type; shape color; and shape layering/grouping, among other examples. Feature data may further comprise feature data pertaining to any visual style attributes for the first slide-based template, which may be analyzed in coordination with the feature data for objects of the first slide-based template. As an example, feature data may be extracted from a slide-based template that is associated with a presentation theme (e.g., providing a first set of visual style attributes for the first slide-based template). This process may be repeated to train AI processing on specific formatted templates (and features thereof) or execute real-time processing to generate transformation of a formatted template. In some alternative examples, trained AI processing may be configured to generate transformation of only presentation themes and feature data related thereto. For instance, a library of presentation themes may also be maintained and managed to aid subsequent generation of transformed templates.

While reference is made to a formatted template, it is to be understood that feature data can be extracted and analyzed for one or more formatted templates (e.g., a set of formatted templates) and/or a presentation theme (e.g., a presentation theme associated with a set of formatted templates). Furthermore, while non-limiting examples of the present disclosure have described transformation of formatted templates, and corresponding generation of transformed templates, it is to be understood that examples of transformed templates may comprise any instance where: new objects are created and/or a new arrangement of objects is created and/or a style transformation occurs for a formatted template. For example, a transformed template may be created from a targeted analysis of a pre-existing formatted template or from a collective/aggregate analysis of a plurality of formatted templates and/or presentation themes that derived transformations from each of a plurality of pre-existing formatted templates to generate a complete transformed template.

Flow of method 200 may then proceed to processing operation 206, where trained AI processing is applied to analyze formatted templates and generate transformations thereof. Processing operation 206 comprises applying deep learning modeling (e.g., two or more types of deep learning models) to generate transformations of slide-based templates. Transformation of slide-based templates including types of transformations generated by trained AI processing have been described in the foregoing description. In one example, trained AI processing may be applied to execute processing operations 204 through 218 of method 200. However, it is to be understood that trained AI processing may be configured to execute any processing operation of method 200.

The trained AI processing is configured to encode (processing operation 208) feature data of a slide-based template for subsequent AI processing to be administered. Encoding of feature data of a formatted template converts a consumable formatted template into a compressed representation that can be analyzed by deep learning modeling of the trained AI processing. Processing operation 208 may further comprise generating a latent vector (e.g., feature vector) that provides a distributed representation of the feature data. The latent vector may then be propagated to a decoder network that is trained to analyze the latent vector and generate transformations of objects associated with a slide-based template.

Flow of method 200 may then proceed to processing operation 210, where trained decoder networking is applied to generate transformation of a formatted template (or multiple formatted templates). An exemplary decoder network is configured to decompress the encoded data (e.g., latent vector) and reconstruct representations therefrom to return the formatted template to a consumable template. In doing so, a trained decoder network is further able to generate transformations of a formatted template through trained analysis of the latent vector in a latent space (e.g., the distributed representation of feature data). As encodings may be generated at random from anywhere inside the distributed representation, the decoder network learns not only single points in latent space but also nearby points of reference as well. This allows the decoder network to understand and generate a range of variations of encodings during training processing and subsequently in real-time execution.

Decoding processing (processing operation 210) of the present disclosure is specifically configured to work with consumable formatted templates and not only reconstruct a formatted template but also generate transformations of feature data to create transformed templates. As an example, a decoder network may be trained based on training data that comprises feature data for formatted templates associated with a specific presentation theme. This enables the decoder network to become very familiar with visual style attributes that are associated with a specific presentation theme through iterative training. Training data associated with a decoder network may comprise any type of feature data associated with a formatted template as described in the foregoing. In one example, a decoder network is trained based on shape information (e.g., shape position information) of objects associated with formatted templates and further trained based on visual style attributes associated with a specific presentation theme. In some examples, a decoder network may be applied that is trained on the same presentation theme as the encoder network from which it received encoded data (e.g., a latent vector). This can effect transformations in layout/arrangement of objects, a form (e.g., shape of objects), the number of objects added to a layout arrangement, as well as style transformations (e.g., color scheme of presentation theme may be modified/flipped). In cases where a decoder network is trained on formatted template data associated with a specific presentation theme, applying that decoder network to transform formatted templates associated with a different presentation theme may result in even greater transformations of visual style attributes as compared to formatted templates having that original presentation theme. Essentially, decoder networks trained on specific presentation themes are swapped to transform the style of the two themes when generating transformations of formatted templates. This results in transformed templates being generated that mix feature data (e.g. objects and shape information from one formatted template with visual style attributes of another formatted template that is associated with a different presentation theme).

A trained decoder network is further specialized in that it applies formatting rules specific to the type of formatted template (e.g., slide-based template) that is being generated. Decoding processing, using the trained decoder network, may then automatically generate a transformed template. The transformed template comprises: one or more transformations of the objects of the first slide-based template; and a style transformation modifying one or more visual style attributes of the first set of visual style attributes. For instance, a layout of objects of the first slide-based template may be modified such that location of the objects of the first slide-based template are rearranged in a new order. In some examples, a layout/arrangement may be further modified by adding/removing objects to the layout or even changing the shape or type of an object therein. Furthermore, the transformed template modifies one or visual style attributes of the first set of visual style attributes associated with the first presentation theme. As an example, a color scheme of the first slide-based template may be modified based on a decoder network being trained based on the second presentation theme.

As described in the foregoing flow diagrams, trained AI processing is configured to generate (processing operation 214) consumable formatted templates that comprise transformation (e.g., transformed templates such as slide-based templates). However, in some examples, additional processing is applied to improve the generated result and producer higher quality transformed templates. In some examples, method 200 may proceed to processing operation 212, where raw results of transformed templates are generated and propagated or review by one or more discriminators. At processing operation 216, one or more discriminators are applied for the purpose of evaluating the quality of the transformation. Application of exemplary discriminators, configured for formatted template evaluation, have been described in the foregoing description. For example, a trained discriminator may attempt to determine if the formatted template being judged is fake or real. As such, a trained discriminator may act as a curator to determine which transformed templates are high quality enough for presentation to users. One or more transformed templates may be selected for output based on analysis of the formatted templates by the one or more discriminators.

Flow of method 200 may then proceed to processing operation 218. At processing operation 218, formatted templates may be refined. As a starting point to processing operation 218, the trained AI processing may be configured to output raw results from transformation of a formatted template. The raw results may then be evaluated using a programmed algorithm that is configured to automatically refine the raw results from transformation of a formatted template. The algorithm for refinement may be programmed to evaluate various aspects of transformations under the lens of the formatting rules for formatted templates (previously described). Modifications to the transformed template may be made based on a result of applying the algorithm for refinement. For example, imaging associated with objects may be sharpened (including lines and edges). Once refinement is completed, updated raw results may be converted back to a consumable formatted template. At that point, the transformed template is ready for quality review.

Flow of method 200 may then proceed to processing operation 220. At processing operation 220, quality review of transformed templates is executed. In many instances, quality review may be a manual review process by users (e.g., developers and/or end users). In some examples, transformed templates may be previewed in a GUI of an application or service so that end users can provide feedback as to whether they like/dislike the transformed template. Quality review may further comprise identifying comments, criticisms, suggestions etc., all of which can be propagated as template creation guidance that can be utilized to: update/train deep learning modeling of the trained AI processing; help developers determine how to manage a library of formatted templates; and help developers curate formatted templates for subsequent transformation, among other examples.

Once transformed templates have passed quality review, flow of method 200 may proceed to processing operation 222. At processing operation 222, transformed templates are output for subsequent usage. In one example, this may comprise storing transformed templates (e.g., sets of transformed templates having a presentation theme) for subsequent access. For instance, processing operation 222 may comprise updating a library of formatted templates to include one or more transformed templates. In some instances, this may comprise replacing older (and less popular) templates, thereby providing a fresh update to the library of formatted templates. Additional examples of processing 222 may comprise categorizing transformed templates and/or labeling the same to aid storage and retrieval.

An application or service may be configured to interface with a library of formatted templates to enable retrieval of formatted templates for presentation in a GUI of an application/service (processing operation 224). This may occur automatically through interfacing between an application/service component 104 (FIG. 1A) and a formatted template transformation component 106 (FIG. 1A), or based on a request for formatted templates directly provided by a user (e.g., through a GUI of an application or service). An exemplary application or service may be a presentation application/service (e.g., slide-based presentation application/service) that renders GUI features (e.g., menus, listings, notifications, representations of individual transformed templates). In examples where a representation of a transformed template is provided in a GUI, the GUI of an application or service may further be improved by providing GUI features that enable feedback to be provided on transformed templates. This can include selectable GUI features that enable users to indicate whether they like (or dislike) transformed templates and/or presentation themes as well as provide comments/suggestions/criticism. In alternative examples, a rendering of a representation of a transformed template may be displayed in a development application or service to enable developers to visually understand how a transformed template would appear in a GUI rendering.

In examples where GUI elements are provided to enable user feedback to be provided, flow of method 200 may proceed to processing operation 226. At processing operation 226, user feedback is received from users (e.g., end user and/or developer). In cases where user feedback is provided, that user feedback may be propagated as template creation guidance to update (processing operation 228) future iterations of trained AI processing. In any example, flow of method 200 may proceed to processing operation 228, where trained AI processing is updated through template guidance. As indicated in the foregoing, template guidance may comprise user feedback. However, template guidance may take any form including analysis of signal data from usage of transformed templates and/or user actions pertaining thereto. Template guidance may also take the form of lifecycle determinations, which can help identify which formatted templates to replace/remove and/or which formatted templates should be used to generate new transformed templates. Method 200 may then be re-executed to continuously generate new transformed templates.

FIGS. 3A-3C illustrate exemplary processing device views associated with user interface examples for an improved user interface that is configured to enable provision of representations of transformations of slide-based formatted templates, with which aspects of the present disclosure may be practiced. FIGS. 3A-3C provide non-limiting front-end examples of processing described in the foregoing including system diagram 100 (FIG. 1A), flow diagram 120 (FIG. 1B), flow diagram 160 (FIG. 1C) and method 200 (FIG. 2).

FIG. 3A presents processing device view 300, illustrating a GUI of a presentation application or service (e.g., slide-based presentation application or service) that is configured to enable presentation of slide-based templates. In the example shown in processing device view 300, the GUI of the presentation application/service displays representation 302 of a slide-based template that has already been edited. It is recognized that applicability of the present disclosure extends not only to unedited formatted templates, but also those which have been edited by a user. Through the latter, the present disclosure can improve usability of applications/services by providing automatic transformations of pre-existing slides so that a user can visually see how their presentations can be transformed.

The representation 302 shown in processing device view 300 comprises a plurality of objects arranged in a layout as shown in processing device view 300. For instance, representation 302 comprises a first line object 304 and a second line object 306, representing vertical lines that frame other object portions of the slide-based template. The representation 302 further comprises a title box 308 providing a title ("Network Security Discussion Topics") for the slide-based template. Additionally, the representation 302 displays embedded content portions for providing slide content in the slide-based template. A first content portion 310 provides a layout for content associated with a first topic ("topic #1: network vulnerabilities") and a second content portion 312 provides a layout for content associated with a second topic ("topic #2: server configurations"). Processing of the present disclosure may be applied to generate a transformed template of the representation 302 shown in processing device view 300.

FIG. 3B presents processing device view 320, illustrating a continued example of the representation 302 that is shown in processing device view 300 (FIG. 3A). The example shown in processing device view 320 illustrates a non-limiting example of a transformed template from the representation shown in 302 (without the actual content added by a user). For instance, one or more transformations of the representation 302 may be provided through a GUI as a recommendation for transforming a current version of a slide.

A transformed template, as shown in processing device view 320, comprises object transformations of objects of the slide-based template including transformation of the objects themselves. Turning back to processing device view 300, the first line object 304 and a second line object 306 were represented as vertical lines that frame other object portions of the slide-based template. In the example shown, in processing device 320, a modified object 324 is generated that combines vertical lines (304 and 306) and further changes layout positioning of the vertical lines. The representation shown in processing device view 320 further comprises transformation 326 of the title box 308 (of FIG. 3A) where the title box is re-located to a bottom portion of slide-based template and also comprises a color scheme change (e.g., white fill as compared to a black fill shown in representation 302). Moreover, the transformation 326 to the title box further comprises the addition of a data object 328 that enables users to add visual content to that portion of the slide-based template (e.g., data object for icon and/or image insertion).

Additionally, the transformed template representation 302 displays embedded content portions for providing slide content in the slide-based template. In the example of the transformed shown in processing device view 320, object transformation and style transformation has been further applied to the content portions (originally shown as the first content portion 310 and the second content portion 312 in FIG. 3A). In processing device view 320, transformations of a first object portion 330 of shown as changing the shape and positioning of that content portion as well as changing a representation of list items (bulleted list) within that content portion. As further illustrated, a style transformation has been further applied to the first object portion 330. Similarly, processing device view 320 shows transformations of a second object portion 332 is shown as changing the shape and positioning of that content portion as well as changing a representation of list items (bulleted list) within that content portion. As further illustrated, a style transformation has been further applied to the second object portion 332.

FIG. 3C presents processing device view 340, illustrating a continued example of the representation 302 that is shown in processing device view 300 (FIG. 3A). The example shown in processing device view 340 illustrates a non-limiting example of a transformed template from the representation shown in 302 (with the actual content previously added by a user). For instance, one or more transformations of the representation 302 may be provided through a GUI as a recommendation for transforming a current version of a slide.

A transformed template, as shown in processing device view 340, comprises object transformations of objects of the slide-based template including transformation of the objects themselves. Turning back to processing device view 300, the first line object 304 and a second line object 306 were represented as vertical lines that frame other object portions of the slide-based template. In the example shown, in processing device 340, a first line object 346 and a second line object 348 are transformed into horizontal lines, where the layout thereof is automatically modified as compared with representation 302 (FIG. 3A). The representation shown in processing device view 340 further comprises transformation 342 of the title box 308 (of FIG. 3A) where the title box comprises a positional object transformation as well as a style transformation (e.g., color scheme change (e.g., white fill as compared to a black fill shown in representation 302).

Additionally, the representation 302 displays embedded content portions for providing slide content in the slide-based template. In the transformed template shown in processing device view 340, object transformation and style transformation has been further applied to the content portions (originally shown as the first content portion 310 and the second content portion 312 in FIG. 3A). In processing device view 340, transformations of a first object portion 350 are shown as changing the shape and positioning of that content portion as well as effecting a style transformation (e.g., color scheme modification). Similarly, processing device view 340 provides transformations of a second object portion 352 are shown as changing the shape and positioning of that content portion as well as effecting a style transformation (e.g., color scheme modification).

Figure 4:
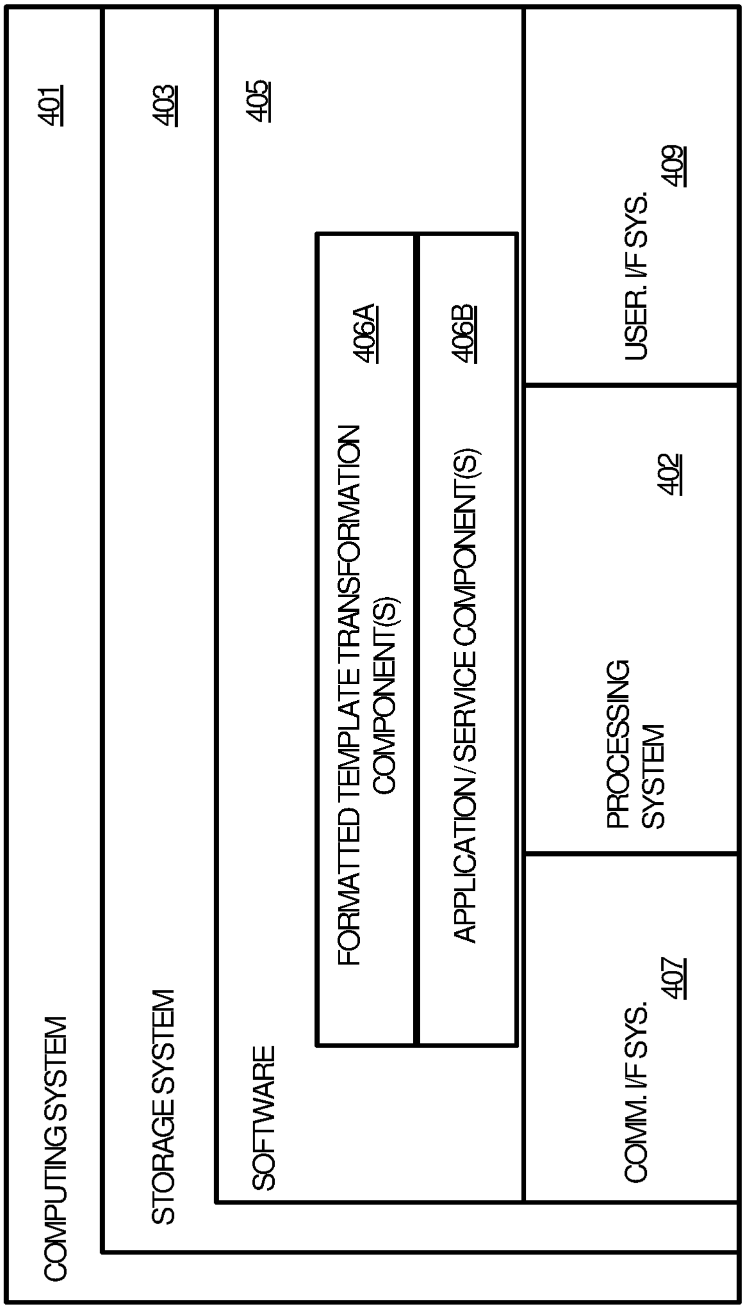
FIG. 4 illustrates a computing system suitable for implementing processing operations described herein related to automatic generation of transformations of formatted templates, with which aspects of the present disclosure may be practiced.

FIG. 4 illustrates a computing system 401 suitable for implementing processing operations described herein related to automatic generation of transformations of formatted templates, with which aspects of the present disclosure may be practiced. As referenced above, computing system 401 may be configured to implement processing operations of any component described herein including exemplary formatted template transformation component(s) previously described (e.g., formatted template transformation component(s) 106 of FIG. 1A). As such, computing system 401 may be configured as a specific purpose computing device that execute specific processing operations to solve the technical problems described herein including those pertaining to automatic generations of transformations of formatted templates such as slide-based formatted templates. Computing system 401 may be implemented as a single apparatus, system, or device or may be implemented in a distributed manner as multiple apparatuses, systems, or devices. For example, computing system 401 may comprise one or more computing devices that execute processing for applications and/or services over a distributed network to enable execution of processing operations described herein over one or more applications or services. Computing system 401 may comprise a collection of devices executing processing for front-end applications/services, back-end applications/service or a combination thereof. Computing system 401 comprises, but is not limited to, a processing system 402, a storage system 403, software 405, communication interface system 407, and user interface system 409. Processing system 402 is operatively coupled with storage system 403, communication interface system 407, and user interface system 409. Non-limiting examples of computer system 401 comprise but are not limited to: smart phones, laptops, tablets, PDAs, desktop computers, servers, smart computing devices including television devices and wearable computing devices including VR devices and AR devices, e-reader devices, gaming consoles and conferencing systems, among other non-limiting examples.

Processing system 402 loads and executes software 405 from storage system 403. Software 405 includes one or more software components (e.g., 406*a* and 406*b*) that are configured to enable functionality described herein. In some examples, computing system 401 may be connected to other computing devices (e.g., display device, audio devices, servers, mobile/remote devices, VR devices, AR devices, etc.) to further enable processing operations to be executed. When executed by processing system 402, software 405 directs processing system 402 to operate as described herein for at least the various processes, operational scenarios, and sequences discussed in the foregoing implementations. Computing system 401 may optionally include additional devices, features, or functionality not discussed for purposes of brevity. Computing system 401 may further be utilized to execute system diagram 100 (FIG. 1A), flow diagram 120 (FIG. 1B), flow diagram 160 (FIG. 1C) and method 200 (FIG. 2) and/or the accompanying description of FIGS. 3A-3C.

Referring still to FIG. 4, processing system 402 may comprise processor, a micro-processor and other circuitry that retrieves and executes software 405 from storage system 403. Processing system 402 may be implemented within a single processing device but may also be distributed across multiple processing devices or sub-systems that cooperate in executing program instructions. Examples of processing system 402 include general purpose central processing units, microprocessors, graphical processing units, application specific processors, sound cards, speakers and logic devices, gaming devices, VR devices, AR devices as well as any other type of processing devices, combinations, or variations thereof.

Storage system 403 may comprise any computer readable storage media readable by processing system 402 and capable of storing software 405. Storage system 403 may include volatile and nonvolatile, removable and non-removable media implemented in any method or technology for storage of information, such as computer readable instructions, data structures, program modules, cache memory or other data. Examples of storage media include random access memory, read only memory, magnetic disks, optical disks, flash memory, virtual memory and non-virtual memory, magnetic cassettes, magnetic tape, magnetic disk storage or other magnetic storage devices, or other suitable storage media, except for propagated signals. In no case is the computer readable storage media a propagated signal.

In addition to computer readable storage media, in some implementations storage system 403 may also include computer readable communication media over which at least some of software 405 may be communicated internally or externally. Storage system 403 may be implemented as a single storage device but may also be implemented across multiple storage devices or sub-systems co-located or distributed relative to each other. Storage system 403 may comprise additional elements, such as a controller, capable of communicating with processing system 402 or possibly other systems.

Software 405 may be implemented in program instructions and among other functions may, when executed by processing system 402, direct processing system 402 to operate as described with respect to the various operational scenarios, sequences, and processes illustrated herein. For example, software 405 may include program instructions for executing one or more formatted template transformation component(s) 406*a* as described herein. Software 405 may further comprise application/service component(s) 406*b* that provide applications/services as described in the foregoing description such as applications/services that enable access to representations of formatted templates including slide-based presentation applications/services, among other examples.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 405 may include additional processes, programs, or components, such as operating system software, virtual machine software, or other application software. Software 405 may also comprise firmware or some other form of machine-readable processing instructions executable by processing system 402.

In general, software 405 may, when loaded into processing system 402 and executed, transform a suitable apparatus, system, or device (of which computing system 401 is representative) overall from a general-purpose computing system into a special-purpose computing system customized to execute specific processing components described herein as well as process data and respond to queries. Indeed, encoding software 405 on storage system 403 may transform the physical structure of storage system 403. The specific transformation of the physical structure may depend on various factors in different implementations of this description. Examples of such factors may include, but are not limited to, the technology used to implement the storage media of storage system 403 and whether the computer-storage media are characterized as primary or secondary storage, as well as other factors.

For example, if the computer readable storage media are implemented as semiconductor-based memory, software 405 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 407 may include communication connections and devices that allow for communication with other computing systems (not shown) over communication networks (not shown). Communication interface system 407 may also be utilized to cover interfacing between processing components described herein. Examples of connections and devices that together allow for inter-system communication may include network interface cards or devices, antennas, satellites, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 409 is optional and may include a keyboard, a mouse, a voice input device, a touch input device for receiving a touch gesture from a user, a motion input device for detecting non-touch gestures and other motions by a user, gaming accessories (e.g., controllers and/or headsets) and other comparable input devices and associated processing elements capable of receiving user input from a user. Output devices such as a display, speakers, haptic devices, and other types of output devices may also be included in user interface system 409. In some cases, the input and output devices may be combined in a single device, such as a display capable of displaying images and receiving touch gestures. The aforementioned user input and output devices are well known in the art and need not be discussed at length here.

User interface system 409 may also include associated user interface software executable by processing system 402 in support of the various user input and output devices discussed above. Separately or in conjunction with each other and other hardware and software elements, the user interface software and user interface devices may support a graphical user interface, a natural user interface, or any other type of user interface, for example, that enables front-end processing of exemplary applications/services described herein including rendering of: formatted templates including a set of formatted templates (e.g., having a specific presentation theme; representations of GUI elements presenting formatted templates including listings/menus for user selection of formatted templates; and notifications of automatic generation of transformed templates (e.g., transformations of formatted templates), among other examples. User interface system 409 comprises a graphical user interface that presents graphical user interface elements representative of any point in the processing described in the foregoing description including processing operations described in system diagram 100 (FIG. 1A), flow diagram 120 (FIG. 1B), flow diagram 160 (FIG. 1C), method 200 (FIG. 2) and front-end representations related to the description of FIGS. 3A-3C. A graphical user interface of user interface system 409 may further be configured to display graphical user interface elements (e.g., data fields, menus, links, graphs, charts, data correlation representations and identifiers, etc.) that are representations generated from processing described in the foregoing description. Exemplary applications/services may further be configured to interface with processing components of computing device 401 that enable output of other types of signals (e.g., audio output, handwritten input) in conjunction with operation of exemplary applications/services (e.g., slide-based presentation application or service) described herein.

Communication between computing system 401 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), Bluetooth, infrared, RF, cellular networks, satellite networks, global positioning systems, as well as any other suitable communication protocol, variation, or combination thereof.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A method comprising:

extracting feature data for objects of a first slide-based template and feature data for visual style attributes of the first slide-based template, wherein the feature data for the objects comprises shape information for the objects, and wherein the first slide-based template is associated with a first presentation theme providing a first set of visual style attributes for the objects of the first slide-based template;

applying trained artificial intelligence (AI) processing, configured for generation of transformations of slide-based templates, to generate a transformation of the first slide-based template, wherein the applying of the trained AI processing executes processing operations that comprise:

encoding the feature data for the objects of the first slide-based template as a latent vector providing a distributed representation of the feature data, propagating the latent vector to a first decoder network selected from a plurality of decoder networks, wherein each of the plurality of decoder networks is trained based on training data comprising data for slide-based templates having one of a plurality of different presentation themes, wherein the first decoder network is trained based on training data comprising data for slide-based templates having a second presentation theme of the plurality of different presentation themes, wherein the second presentation theme is different from the first presentation theme and provides a second set of visual style attributes for objects thereof, and automatically generating a transformed template for the first slide-based template based on analysis of the latent vector using the first decoder network, wherein the transformed template comprises: one or more transformations of the objects of the first slide-based template and a style transformation modifying one or more visual style attributes of the first set of visual style attributes; and storing the transformed template for subsequent presentation through a productivity service.

2. The method of claim 1, further comprising:

transmitting data for rendering of a representation of the transformed template to a component associated with the productivity service, wherein the productivity service is a slide-based presentation service.

3. The method of claim 1, wherein the feature data comprises shape position information of objects of the first slide-based template, and wherein the one or more transformations of the objects of the first slide-based template comprises a modification of placement positioning of one or more of the objects of the first slide-based template.

4. The method of claim 3, wherein the training data comprises shape position information of objects within a slide-based template which is used to condition the decoder network for generation of new placement positioning for objects of a target slide-based template.

5. The method of claim 1, wherein the style transformation of the first slide-based template is a modification of a color scheme associated with the first presentation theme based on a color scheme associated with the second presentation theme.

6. The method of claim 5, wherein the one or more transformations of the objects of the first slide-based template comprises a modification of placement positioning of one or more of the objects of the first slide-based template, and wherein the modification of the color scheme associated with the first presentation theme comprises modifying a color of the one or more of the objects of the first slide-based template that are modified.

7. The method of claim 1, further comprising:

extracting second feature data for a second slide-based template;

encoding the second feature data for the objects of the second slide-based template as a second latent vector providing a distributed representation of the second feature data;

propagating the second latent vector to a second decoder network trained based on training data comprising data for slide-based templates having the first presentation theme; and automatically generating a transformed template for the second slide-based template based on analysis of the second latent vector using the second decoder network, wherein the transformed template for the second slide-based template comprises:

one or more transformations of the objects of the second slide-based template and a style transformation modifying one or more visual style attributes of the second set of visual style attributes.

8. The method of claim 1, wherein the applying of the trained AI processing, for generation of transformations of slide-based templates, further comprises applying: two or more trained generative deep learning models, wherein the two or more trained generative deep learning models are selected from a group that comprises: a variable auto encoder (VAE), a generative adversarial network (GAN), a generative pre-trained transformer (GPT) and a Deepfake learning model.

9. A system comprising:

at least one processor; and a memory, operatively connected with the at least one processor; storing computer-executable instructions that, when executed by the at least one processor, causes the at least one processor to execute a method that comprises:

extracting feature data for objects of a first slide-based template and feature data for visual style attributes of the first slide-based template, wherein the feature data for the objects comprises shape information for the objects, and wherein the first slide-based template is associated with a first presentation theme providing a first set of visual style attributes for the objects of the first slide-based template;

applying trained artificial intelligence (AI) processing, configured for generation of transformations of slide-based templates, to generate a transformation of the first slide-based template, wherein the applying of the trained AI processing executes processing operations that comprise:

encoding the feature data for the objects of the first slide-based template as a latent vector providing a distributed representation of the feature data, propagating the latent vector to a first decoder network selected from a plurality of decoder networks, wherein each of the plurality of decoder networks is trained based on training data comprising data for slide-based templates having one of a plurality of different presentation themes, wherein the first decoder network is trained based on training data comprising data for slide-based templates having a second presentation theme of the plurality of different presentation themes, wherein the second presentation theme is different from the first presentation theme and provides a second set of visual style attributes for objects thereof, and automatically generating a transformed template for the first slide-based template based on analysis of the latent vector using the first decoder network, wherein the transformed template comprises: one or more transformations of the objects of the first slide-based template and a style transformation modifying one or more visual style attributes of the first set of visual style attributes; and storing the transformed template for subsequent presentation through a productivity service.

10. The system of claim 9, wherein the method, executed by the at least one processor, further comprises:

transmitting data for rendering of a representation of the transformed template to a component associated with the productivity service, wherein the productivity service is a slide-based presentation service.

11. The system of claim 9, wherein the feature data comprises shape position information of objects of the first slide-based template, and wherein the one or more transformations of the objects of the first slide-based template comprises a modification of placement positioning of one or more of the objects of the first slide-based template.

12. The system of claim 11, wherein the training data comprises shape position information of objects within a slide-based template which is used to condition the decoder network for generation of new placement positioning for objects of a target slide-based template.

13. The system of claim 9, wherein the style transformation of the first slide-based template is a modification of a color scheme associated with the first presentation theme based on a color scheme associated with the second presentation theme.

14. The system of claim 13, wherein the one or more transformations of the objects of the first slide-based template comprises a modification of placement positioning of one or more of the objects of the first slide-based template, and wherein the modification of the color scheme associated with the first presentation theme comprises modifying a color of the one or more of the objects of the first slide-based template that are modified.

15. The system of claim 9, wherein the method, executed by the at least one processor, further comprises:

extracting second feature data for a second slide-based template;

encoding the second feature data for the objects of the second slide-based template as a second latent vector providing a distributed representation of the second feature data;

propagating the second latent vector to a second decoder network trained based on training data comprising data for slide-based templates having the first presentation theme; and automatically generating a transformed template for the second slide-based template based on analysis of the second latent vector using the second decoder network, wherein the transformed template for the second slide-based template comprises:

one or more transformations of the objects of the second slide-based template and a style transformation modifying one or more visual style attributes of the second set of visual style attributes.

16. The system of claim 9, wherein the applying of the trained AI processing, for generation of transformations of slide-based templates, further comprises applying: two or more trained generative deep learning models, wherein the two or more trained generative deep learning models are selected from a group that comprises: a variable auto encoder (VAE), a generative adversarial network (GAN), a generative pre-trained transformer (GPT) and a Deepfake learning model.

17. A method comprising:

extracting first feature data for a first set of formatted templates associated with a slide-based presentation, wherein the first set of formatted templates are part of a first presentation theme of a plurality of different presentation themes providing a first set of visual style attributes for objects of the first set of formatted templates;

extracting second feature data for a second set of formatted templates associated with a slide-based presentation, wherein the second set of formatted templates are part of a second presentation theme of the plurality of different presentation themes providing a second set of visual style attributes for objects of the second set of formatted templates;

applying trained artificial intelligence (AI) processing, configured for generation of transformations of slide-based templates, to generate a transformation of the first set of formatted templates and a transformation of the second set of formatted templates, wherein the applying of the trained AI processing executes processing operations that comprise:

encoding the first feature data of the first set of formatted templates as a first latent vector providing a distributed representation of the first feature data, encoding the second feature data of the second set of formatted templates as a second latent vector providing a distributed representation of the second feature data, propagating the first latent vector to a first decoder network selected from a plurality of decoder networks, wherein each of the plurality of decoder networks is trained based on training data comprising data for slide-based templates having one of the plurality of different presentation themes, wherein the first decoder network is trained based on training data comprising data for slide-based templates having the second presentation theme, propagating the second latent vector to a second decoder network selected from the plurality of decoder networks, wherein the second decoder network is trained based on training data comprising data for slide-based templates having the first presentation theme, automatically generating a transformed set of formatted templates for the first set of formatted templates based on analysis of the first latent vector using the first decoder network, wherein the transformed set of formatted templates comprises: one or more transformations of the objects within a slide-based template of the first set of formatted templates and a style transformation modifying one or more visual style attributes of the first set of visual style attributes, and automatically generating a transformed set of formatted templates for the second set of formatted templates based on analysis of the second latent vector using the second decoder network, wherein the transformed set of formatted templates for the second set of formatted templates comprises:

one or more transformations of the objects within a slide-based template of the first set of formatted templates and a style transformation modifying one or more visual style attributes of the first set of visual style attributes; and storing the transformed set of formatted templates for the first set of formatted templates and the transformed set of formatted templates for the second set of formatted templates.

18. The method of claim 17, further comprising:

transmitting, to a client computing device executing a productivity service, data for rendering a representation of: the transformed set of formatted templates for the first set of formatted templates, and the transformed set of formatted templates for the second set of formatted templates.

19. The method of claim 17, wherein the first feature data comprises shape position information of objects of the first set of formatted templates, wherein the one or more transformations of the objects of the first set of formatted templates comprises a modification of placement positioning of one or more of the objects of the first set of formatted templates, and wherein the style transformation modifies a color scheme associated with the one or more objects modified in the modification of placement positioning.

20. The method of claim 19, wherein the second feature data comprises shape position information of objects of the second set of formatted templates, wherein the one or more transformations of the objects of the second set of formatted templates comprises a modification of placement positioning of one or more of the objects of the second set of formatted templates, and wherein the style transformation modifies a color scheme associated with the one or more objects modified in the modification of placement positioning of one or more of the objects of the second set of formatted templates.

* * * * *